United States Patent
Gardner et al.

(10) Patent No.: US 11,512,179 B2
(45) Date of Patent: *Nov. 29, 2022

(54) SUPPORTED ELASTOMERIC FOAMS AND PROCESSES FOR MAKING SAME

(71) Applicants: W. L. Gore & Associates, Inc., Newark, DE (US); W. L. Gore & Associates GmbH, Putzbrunn (DE)

(72) Inventors: John Gardner, Newark, DE (US); Amadeus Wiesemann, Putzbrunn (DE)

(73) Assignees: W. L. Gore & Associates, Inc., Newark, DE (US); W. L. Gore & Associates, GmbH, Putzbrunn (DE)

( * ) Notice: Subject to any disclaimer, the term of this patent is extended or adjusted under 35 U.S.C. 154(b) by 251 days.

This patent is subject to a terminal disclaimer.

(21) Appl. No.: 16/621,063

(22) PCT Filed: Jun. 15, 2018

(86) PCT No.: PCT/US2018/037910
§ 371 (c)(1),
(2) Date: Dec. 10, 2019

(87) PCT Pub. No.: WO2018/232347
PCT Pub. Date: Dec. 20, 2018

(65) Prior Publication Data
US 2020/0198305 A1 Jun. 25, 2020

Related U.S. Application Data

(60) Provisional application No. 62/520,421, filed on Jun. 15, 2017.

(51) Int. Cl.
*C08J 9/35* (2006.01)
*B32B 5/20* (2006.01)
(Continued)

(52) U.S. Cl.
CPC .............. *C08J 9/35* (2013.01); *B32B 3/26* (2013.01); *B32B 5/024* (2013.01); *B32B 5/18* (2013.01);
(Continued)

(58) Field of Classification Search
CPC ........... B32B 5/18; B32B 7/14; B32B 27/065; B32B 5/024; C08J 9/228; F16J 15/022; F16J 15/06
See application file for complete search history.

(56) References Cited

U.S. PATENT DOCUMENTS

| | | | |
|---|---|---|---|
| 4,425,396 A | * | 1/1984 | Hartman .................. B32B 5/18 428/220 |
| 4,857,668 A | | 8/1989 | Buonanno |

(Continued)

FOREIGN PATENT DOCUMENTS

WO 03/037125 A1 5/2003

OTHER PUBLICATIONS

International Search Report and Written Opinion for International Application No. PCT/US2018/037910 dated Jul. 20, 2018.
(Continued)

*Primary Examiner* — Hai Vo

(57) ABSTRACT

A supported elastomeric foam (100) includes an elastomeric matrix (102) formed of an elastomer and including a reinforcement region (104) and a foamed region (106). The foamed region includes gas filled cells (108) in the elastomer, and the reinforcement region includes a porous layer (204) having an interconnected network of pores at least partially imbibed with the elastomer. The foam can include an adhesive at a surface of the foam. A compressible seal (802) including a compressible body, which can be elastomeric foam, can also include a pattern of discontinuous adhesive regions about which the compressible body can deform to form a sea. The supported elastomeric foam can
(Continued)

form a gas tight seal in an interface when placed under minimal compression.

27 Claims, 6 Drawing Sheets

(51) Int. Cl.

| | | |
|---|---|---|
| *B32B 7/12* | (2006.01) | |
| *B32B 27/06* | (2006.01) | |
| *B32B 27/28* | (2006.01) | |
| *B32B 27/32* | (2006.01) | |
| *C08J 9/232* | (2006.01) | |
| *B32B 3/26* | (2006.01) | |
| *B32B 5/18* | (2006.01) | |
| *B32B 7/14* | (2006.01) | |
| *C08J 9/228* | (2006.01) | |
| *F16J 15/02* | (2006.01) | |
| *F16J 15/06* | (2006.01) | |
| *C09J 7/38* | (2018.01) | |
| *C09J 7/26* | (2018.01) | |
| *B32B 5/02* | (2006.01) | |
| *B32B 5/32* | (2006.01) | |
| *B32B 25/04* | (2006.01) | |
| *B32B 25/10* | (2006.01) | |
| *B32B 25/16* | (2006.01) | |

(52) U.S. Cl.
CPC ............ *B32B 5/20* (2013.01); *B32B 5/32* (2013.01); *B32B 7/12* (2013.01); *B32B 7/14* (2013.01); *B32B 25/045* (2013.01); *B32B 25/10* (2013.01); *B32B 25/16* (2013.01); *B32B 27/065* (2013.01); *B32B 27/283* (2013.01); *B32B 27/285* (2013.01); *B32B 27/322* (2013.01); *C08J 9/228* (2013.01); *C08J 9/232* (2013.01); *C09J 7/26* (2018.01); *C09J 7/385* (2018.01); *F16J 15/022* (2013.01); *F16J 15/06* (2013.01); *B32B 2260/021* (2013.01); *B32B 2260/048* (2013.01); *B32B 2262/0215* (2013.01); *B32B 2266/025* (2013.01); *B32B 2266/0235* (2013.01); *B32B 2270/00* (2013.01); *B32B 2305/026* (2013.01); *B32B 2307/50* (2013.01); *B32B 2307/514* (2013.01); *B32B 2307/54* (2013.01); *B32B 2307/72* (2013.01); *B32B 2307/7265* (2013.01); *B32B 2307/732* (2013.01); *B32B 2310/0831* (2013.01); *B32B 2581/00* (2013.01); *C08J 2327/18* (2013.01); *C09J 2301/124* (2020.08); *C09J 2301/204* (2020.08); *C09J 2421/006* (2013.01); *C09J 2433/00* (2013.01); *C09J 2483/00* (2013.01)

(56) References Cited

U.S. PATENT DOCUMENTS

| | | | |
|---|---|---|---|
| 4,999,931 A | | 3/1991 | Vermeulen |
| 5,105,056 A | * | 4/1992 | Hoge, Jr ............... F16J 15/061 |
| | | | 174/356 |
| 5,286,568 A | | 2/1994 | Bacino et al. |
| 2003/0104205 A1 | * | 6/2003 | Brodeur, Jr. ............. B32B 5/24 |
| | | | 428/374 |
| 2003/0173100 A1 | * | 9/2003 | Flaherty ............... H05K 9/0015 |
| | | | 174/359 |
| 2004/0142149 A1 | | 7/2004 | Mollendorf et al. |
| 2005/0233132 A1 | | 10/2005 | Kojima |
| 2006/0012070 A1 | | 1/2006 | Fontecchio et al. |
| 2007/0196646 A1 | | 8/2007 | Matano et al. |
| 2013/0056258 A1 | | 3/2013 | Zhang et al. |
| 2015/0084288 A1 | | 3/2015 | Arata et al. |
| 2016/0082625 A1 | | 3/2016 | Fors et al. |
| 2020/0190278 A1 | * | 6/2020 | Gardner ................. B32B 5/024 |
| 2021/0147719 A1 | * | 5/2021 | Gardner ................... B32B 5/20 |

OTHER PUBLICATIONS

International Preliminary Report on Patentability received for PCT Patent Application No. PCT/US17/55111, dated Dec. 26, 2019, 7 pages.

International Preliminary Report on Patentability received for PCT Patent Application No. PCT/US2017/055114, dated Dec. 26, 2019, 10 pages.

International Preliminary Report on Patentability received for PCT Patent Application No. PCT/US2018/037910, dated Dec. 26, 2019, 9 pages.

International Search Report and Written Opinion received for PCT Patent Application No. PCT/US 17/55111, dated Mar. 20, 2018, 9 pages.

International Search Report and Written Opinion received for PCT Patent Application No. PCT/US2017/055114, dated Jun. 28, 2018, 15 pages.

\* cited by examiner

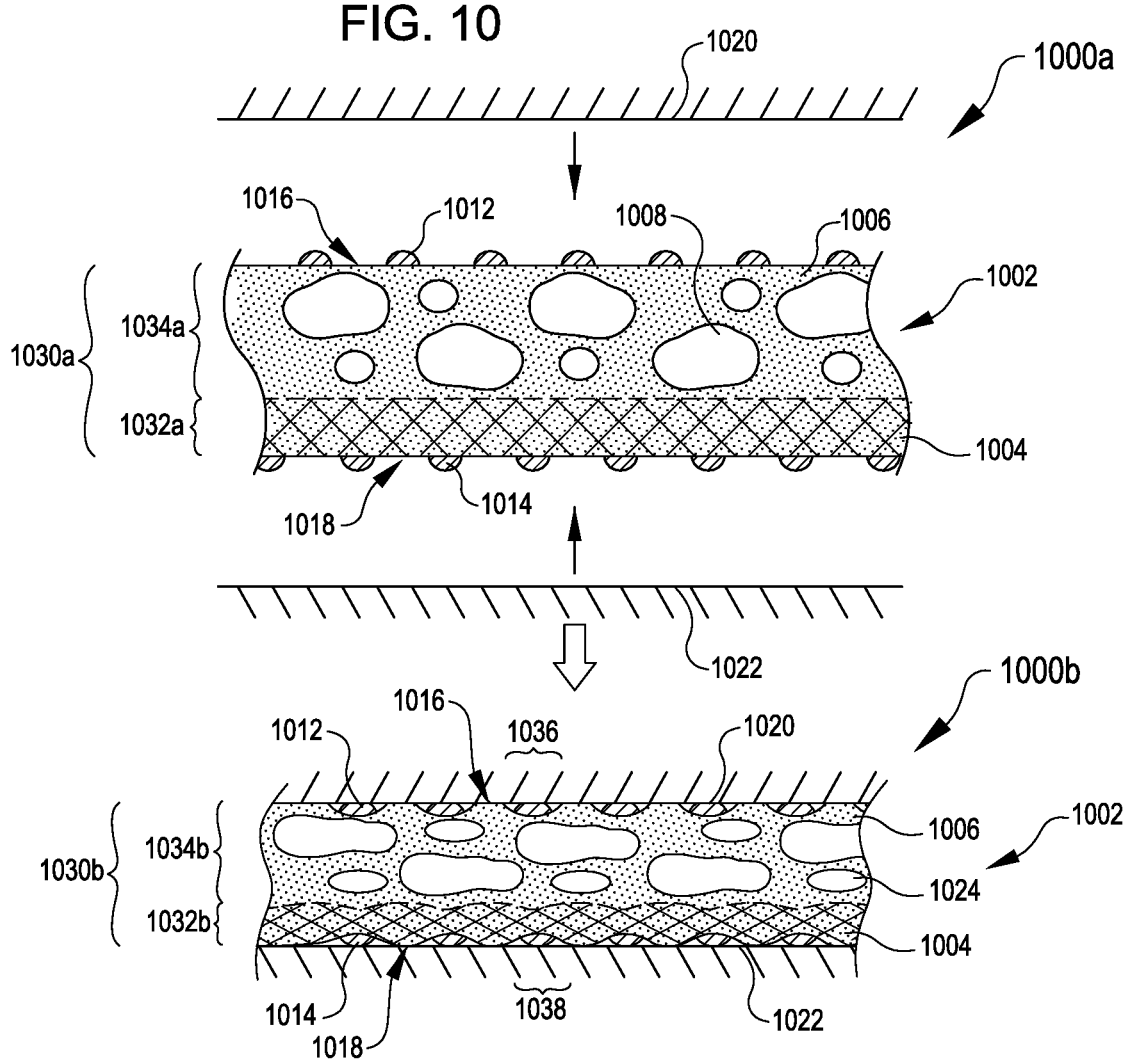

SUPPORTED ELASTOMERIC FOAMS AND PROCESSES FOR MAKING SAME

RELATED APPLICATIONS

The present application is a national phase filing under 35 USC 371 of International Application No. PCT/US2018/037910, filed on Jun. 15, 2018, which claims priority to International Application No. PCT/US2017/055111, filed on Oct. 4, 2017, and U.S. Provisional Application No. 62/520,421, filed on Jun. 15, 2017, the entire contents and disclosures of which are hereby incorporated by reference.

CROSS-REFERENCE TO RELATED APPLICATIONS

The present application claims the benefit of International Application No. PCT/US2017/055111 filed Oct. 4, 2017, which claims priority to U.S. Provisional Application No. 62/520,421 filed Jun. 15, 2017, the full disclosures of which are incorporated herein by reference in their entirety for all purposes.

TECHNICAL FIELD

The present disclosure generally relates to supported elastomeric foams. More specifically, the disclosure relates to a supported elastomeric matrix foam for sealing connections.

BACKGROUND

Many industries employ sealants to prevent liquid intrusion between physical elements in products or structures. Common sealants include paints, caulks, polymeric materials, O-rings and gaskets or the like, and vary according to the specific application. The airline industry, in particular, employs sealants for protecting various interfaces in order to prevent corrosion and surface degradation, e.g., due to water or chemical intrusion.

One of the materials often employed by the aircraft industry is a 2 part liquid polysulfide material, used to increase the protection of various interfaces from corrosion and surface degradation. This practice can be used to protect installed brackets along the airframe, among other assemblies. For example, a material (such as aluminum, fiber reinforced plastic, or carbon composite) can be attached to a section of the aircraft frame using bolts, rivets, or other fasteners. An installer can apply liquid sealant between the connected parts, and then affix the bracket to the frame using fasteners. As the fasteners are tightened, the pressure from the fastener heads spreads the sealant. The sealant typically must be allowed to cure at room temperature for long periods of time, e.g., 8 to 72 hours or more, depending on the sealant grade. This process is time consuming, requires careful mixing and application techniques, and typically requires personal protective equipment (PPE) and ventilation due to the volatile organic compounds (VOCs) that are emitted.

Traditional designs that make use of "dry sealing" materials, such as O-rings, gaskets, or other pliable structures, require precise placement and pressure to be effective, and can suffer from degradation over time due to chemical attack. Dry sealing materials that can resist chemical attack often have deficiencies with cold operating temperatures and level of conformability. Liquid sealants, which can conform more easily to specific interface geometries, suffer from deficiencies of challenging installation procedures, and cannot readily be removed once adjusted without breaking the seal. Further, polysulfide liquid sealants alone often cannot be effective after prolonged exposure to certain harsh chemistries like phosphate ester hydraulic fluid. Accordingly, the need exists for sealing technologies that can operate in a variety of interface profiles without sacrificing durability or resistance to chemical attack.

SUMMARY

In one embodiment, the present disclosure relates to a supported elastomeric foam. The supported elastomeric foam includes an elastomeric matrix formed of an elastomer that includes a foamed region and a reinforcement region. The foamed region includes a plurality of gas filled cells defined in the elastomer; and the reinforcement region includes a porous layer having an interconnected network of pores at least partially imbibed with the elastomer. In certain embodiments, the reinforcement region can be formed from an elastomer-impregnated expanded polytetrafluoroethylene (ePTFE) film or membrane. In various embodiments, the reinforcement region can be formed from any suitable porous polymer layer, such as a woven polyether ether ketone (PEEK) layer, or the like. In various other embodiments, the reinforcement region can be formed of any suitable porous layer, such as a fiberglass woven or nonwoven layer.

According to some embodiments, the porous layer can be fully imbibed with the elastomer. According to some embodiments, the reinforcement region can be a first reinforcement region, and the elastomeric foam can include a second reinforcement region including a second porous layer having a second interconnected network of pores at least partially imbibed with the elastomer. The first reinforcement region and the second reinforcement region can be positioned at opposite sides of the foamed region.

According to some embodiments, the reinforcement region is substantially free of gas filled cells. For example, according to some embodiments, the porous layer embedded in the reinforcement region has a pore size that is smaller than a particle size of the foaming agent used to form the gas filled cells in the foamed region, such that the foaming agent is prevented from penetrating and expanding within the reinforcement region. According to some embodiments, the elastomeric matrix can include multiple elastomers which can be mixed to form the elastomeric matrix. The closed gas-filled cells can have an average cell size, by diameter, from about 5 μm to about 700 μm.

According to some embodiments, the porous layer in the reinforcement region can be formed of various materials. For example, in some embodiments, the porous layer can include any one of, or any suitable combination of, a woven material, nonwoven material, polymer membrane, or non-polymer porous material. According to some embodiments, the porous layer can include an expanded fluoropolymer film, an expanded polytetrafluoroethylene (ePTFE) film, a polyether ether ketone (PEEK) woven, a PEEK nonwoven, a fiberglass woven, a fiberglass nonwoven, or other suitable porous material. According to some specific embodiments, the porous layer can include an ePTFE film having a thickness from 8 to 35 μm, or from 1 to 100 μm, or from 1 to 300 μm.

According to some embodiments, the supported elastomeric foam can be formed in various thicknesses or configurations. For example, according to some embodiments, the foam can be formed into a sheet having a thickness from 85 to 2000 μm, which may be formed into a roll.

According to some embodiments, the elastomeric matrix can include one or more of a silicone, fluorosilicone, or a perfluoropolyether elastomer. According to some embodiments, the elastomer can include a fluoroelastomer. The foamed region can be formed from a foamed mixture including any suitable elastomer and a foaming agent, e.g., a chemical foaming agent added to the elastomer, a heat activated dry foaming agent, or heat activated expanding polymer spheres. According to some embodiments, the foamed region has a thickness from 90 μm to 1850 μm.

According to some embodiments, the supported elastomeric foam can compress to a strain of up to 85% under stress of 16 MPa. According to various embodiments, the foam exhibits a compression set as low as or lower than 11% when subjected to an initial strain of 25%. The foam can be substantially inert to chemicals such as fuels and capable of forming a fuel-tight seal under compression. For example, according to some embodiments, the foam absorbs less than 2.0% JP-8 fuel by weight when immersed over 20 hours with compression, and can prevent liquid intrusion when the foam is inserted into an interface according to a liquid intrusion test when the foam is subjected to compressive strain of 15% or less. According to some embodiments, the foam can remain operable to seal an interface against liquid intrusion at a range of temperatures from −50° C. to at least 100° C.

According to various embodiments, the elastomeric foam composite can form a gas tight seal between a pair of surfaces at very low clamping pressures, even after repeated and severe mechanical stress. According to various embodiments, the supported elastomeric foam can form a gas tight against a surface at a clamping pressure of 1.0 MPa or less with a He leak rate less than or equal to $10^{-2}$, $10^{-4}$, or preferably $10^{-6}$ mg/m/sec at a He differential pressure of 0.15 MPa. And according to some embodiments, the composite can seal against the clamping surface with a He leak rate less than or equal to $10^{-2}$, or preferably less than $10^{-6}$ mg/m/sec, or in some cases less than or equal to $10^{-7}$ mg/m/sec, at a He differential pressure of 0.15 MPa when the composite is subjected to repeated compressive stress cycling between 1 MPa and 0.3 MPa, or between 200 MPa and 0.3 MPa without damage to the supported elastomeric foam composite. In some embodiments, the elastomeric foam can form a seal against a surface having a surface roughness (i.e. surface finish or Ra) of less than 6.3 micron at minimal compressive strain, i.e. at clamping pressures less than or equal to 0.3 MPa.

According to various embodiments, the supported elastomeric foam has a glass transition temperature of negative 45° C. or less, preferably negative 50° C. or less.

According to various embodiments, the supported elastomeric foam prevents fluid ingress under less than or equal to 15% compressive strain, preferably less than 10%, preferably less than 5%.

According to various embodiments, the supported elastomeric foam is chemically stable against and uptakes less than 3% liquid by mass when immersed in water, jet fuel, and hydraulic fluid.

According to various embodiments, a supported elastomeric foam can include a release liner removably connected with one of the reinforcement and foamed regions that can be removed prior to installation, and can include a second release liner removably connected with the other of the reinforcement and foamed regions.

According to various embodiments, a supported elastomeric foam can include an adhesive treatment on one surface or on both surfaces. The adhesive treatment can include a pattern of discontinuous adhesive regions connected with at least one of a first surface or a second surface of the elastomeric matrix, wherein the elastomeric matrix is operable to conform around the adhesive regions to prevent fluid ingress when the elastomeric foam is compressed in a direction perpendicular to either surface. The deformation of the elastomeric foam under compression forms a seal that shields the adhesive regions within the seal from intrusion by fluid, which protects the adhesive regions from fluids that may be reactive with the adhesive material but not with the elastomeric foam. According to various embodiments, any of the elastomeric foams described herein can be used as a dry sealing gasket, a dry sealing washer, or other form of dry sealant device.

In another embodiment, the present disclosure relates to a method for forming a dry sealant foam. The method includes providing a porous layer that has an interconnected network of pores, and casting a liquid mixture of an elastomer and a foaming agent with the porous layer. The liquid mixture is at least partially imbibed, or in some embodiments fully imbibed, in the porous layer. The foaming agent is activated to create a plurality of closed cells in the liquid mixture. The assembly of the at least partially imbibed porous layer and the foamed region with the plurality of closed cells is cured to form an elastomeric matrix containing a reinforcement region that includes the porous layer and a foamed region containing the plurality of closed cells.

According to some embodiments, methods described herein can include providing a second porous layer that includes a second interconnected network of pores, positioning the second porous layer at a second side of the liquid mixture opposite the first side, such that the liquid mixture wets the second porous layer, and curing the elastomer to form the elastomeric matrix containing a second reinforcement region that includes the second porous layer.

According to various embodiments, an adhesive can be applied to at least one of a first surface and second surface of the elastomeric matrix. Applying the adhesive can include applying a pattern of discontinuous adhesive regions to the at least one of the first surface and second surface. According to some embodiments, applying the adhesive can include applying a full face adhesive to the at least one of the first surface and second surface.

According to some embodiments, the elastomer can include a thermoset fluoroelastomer and a heat activated foaming agent; such that activating the foaming agent includes heating the liquid mixture to an activating temperature, such that the heating cycle dramatically enlarges the size of the plurality of closed gas-filled cells. The activating temperature may be in a range of 100° C. to about 160° C.; and the activating step can include heating the liquid mixture to the activating temperature for 1 to 10 minutes. In some cases, the activating step can also partially cure the elastomeric matrix. A subsequent curing step can include heating the liquid mixture to a curing temperature of approximately 75° C. to 125° C. for 5 to 180 minutes.

In another embodiment, the present disclosure relates to a compressible seal, including a compressible body and a pattern of discontinuous adhesive regions formed of an adhesive connected with at least one of a first surface or a second surface of the compressible body. According to some embodiments, the compressible body is an elastomeric foam, which may include an elastomeric matrix formed with a foamed elastomer as described above, with or without a reinforcing region. The compressible body is operable to conform around the pattern of adhesive regions to prevent fluid ingress via the pattern when the compressible seal is compressed in a direction perpendicular to the first or second surface.

According to some embodiments, the compressible body has a first thickness and is operable to compress by at least 15% of the first thickness under a compressive stress of less than 1 MPa, and wherein the pattern of adhesive regions has a thickness of less than 15% of the first thickness.

According to various embodiments, the pattern of discontinuous adhesive regions can include various specific geometries, including but not limited to any one or combination of an arrangement of circular adhesive dots or square adhesive regions. According to some specific embodiments, the pattern of discontinuous adhesive regions includes circular dots having diameters of about 1 mm, edge to edge spacing of each dot to the next closest dot of about 2.2 mm, and thicknesses of about 0.03 mm. Various specific ranges are possible in accordance with embodiments. For example, the adhesive regions can have diameters (or, if square, side lengths) ranging from about 0.2 mm to about 5 mm, from about 0.2 to 1 mm, or from about 1 mm to 5 mm. Each adhesive region of the pattern of adhesive regions may be spaced apart by a distance ranging from about 0.5 mm to about 25 mm, e.g. from about 1 mm to 20 mm, or from about 2 to 5 mm. In various embodiments, the adhesive regions can have thicknesses less than or equal to 100 µm, less than or equal to 50 µm, less than or equal to 25 µm, or less than or equal to 10 µm. According to some specific embodiments, the adhesive regions may have thicknesses ranging from about 10 µm to about 100 µm; or in some embodiments, from about 10 µm to about 50 µm, or from about 20 µm to about 50 µm.

According to various embodiments, the adhesive can include a variety of specific forms of adhesive including, but not limited to, pressure-sensitive adhesives (PSA), as described in the examples below. Generally, suitable adhesives can be deposited in a liquid or hot melt form, or comparable form. According to some embodiments the adhesive type can be a mixed two-part silicone pressure sensitive adhesive. According to further embodiments, the adhesive type can be a UV-set acrylic pressure sensitive adhesive. Further embodiments can include alternative adhesive materials including, but not limited to, silicone, acrylic, butyl rubber, ethylene-vinyl acetate, natural rubber, nitrile, styrene block copolymer, polyurethane, or any suitable mixture of the above adhesive materials. Some further embodiments can include adhesives in the form of a transfer tape, including full face adhesive transfer tapes. A discontinuous adhesive may be applied in a pattern according to any suitable means, including, e.g., passing the adhesive through a form containing a pattern of holes onto the compressible body or printing the adhesive on the compressible body.

According to various embodiments, the compressible body can include a variety of specific forms, including, e.g., an elastomeric foam including a foamed region including a plurality of gas filled cells defined by the elastomer and a reinforcement region including a porous layer having an interconnected network of pores at least partially imbibed with the elastomer; an unreinforced foam or foam rubber; or comparable compressible sealant.

In another embodiment, the present disclosure relates to a method of forming a compressible seal, including applying a pattern of discontinuous adhesive regions formed of an adhesive to a first surface of a compressible body to an adhesive thickness, the adhesive thickness being sufficiently thin compared to a foam thickness of the compressible seal that the compressible seal is operable to conform around the pattern of discontinuous adhesive regions when compressed. According to some embodiments, applying the pattern of discontinuous adhesive regions includes removably applying a form to the compressible body, where the form has a hole pattern configured to match the pattern of discontinuous adhesive regions. The adhesive can be applied to the form and to the first surface through the hole pattern of the form. According to some alternative embodiments, applying the pattern of discontinuous adhesive regions can include printing the pattern of discontinuous adhesive regions on the first surface. According to some embodiments, the pattern of adhesive regions can be cured by applying a heat treatment to the adhesive, or alternatively, by applying a UV light treatment to the adhesive.

These and other embodiments, along with many of their advantages and features, are described in more detail in conjunction with the below description and attached figures.

BRIEF DESCRIPTION OF THE DRAWINGS

The present disclosure will be better understood in view of the appended non-limiting figures.

FIG. 10 is a side cross-sectional view showing an embodiment of supported elastomeric foam with a discontinuous adhesive layer undergoing compression.

Figure 1:
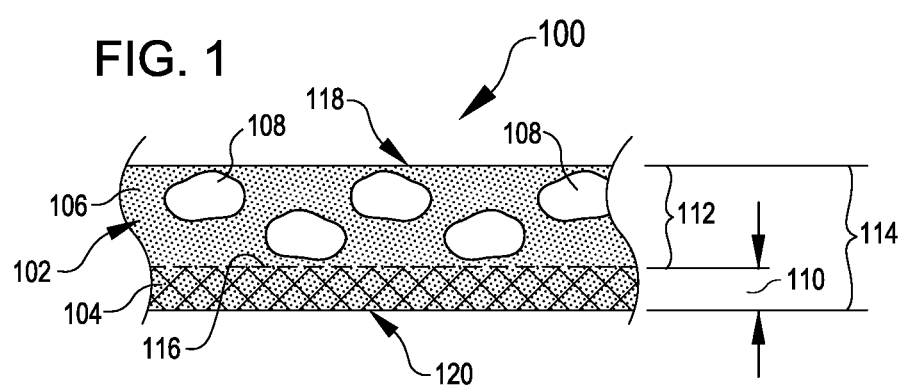
FIG. 1 is a side cross sectional view of an embodiment of supported elastomeric foam.

While the following is amenable to various modifications and alternative forms, specific embodiments have been shown by way of non-limiting examples in the drawings and are described in detail below. The description covers all modifications, equivalents, and alternatives thereof.

DETAILED DESCRIPTION

Various embodiments disclosed herein relate generally to dry sealants for protecting a mechanical interface, e.g., in an airframe structure or comparable structure. In specific embodiments, a dry sealant can be formed of supported elastomeric foam. Suitable elastomeric foams can limit the ability of liquids to penetrate the interface, in order to prevent corrosion, liquid intrusion, or other issues. The elastomeric foam can be formed of a chemically inert material for preventing intrusion by water, jet fuel, hydraulic fluids (including phosphate ester based), oils, de-icing agents, or other materials.

Specific embodiments of supported elastomeric foam include an elastomeric matrix that includes an elastomer defining a foamed region and a reinforcement region. The reinforcement region includes a porous layer defined by an interconnected network of pores in a porous or microporous material, where the pores are at least partially imbibed with the elastomer. According to various embodiments, the porous layer can be imbibed with elastomer until the elastomer penetrates a thickness of the porous layer, even if not all pores are filled with the elastomer. According to some embodiments, the porous layer can be fully imbibed with the elastomer, until all of the pores are filled with elastomer. According to various embodiments, the porous layer can be a porous polymer or fluoropolymer, e.g., a porous membrane such as an expanded polytetrafluoroethylene (ePTFE) membrane, a woven, a nonwoven, or other suitable porous layer. According to some embodiments, the porous layer can be a porous fiberglass layer, e.g., a fiberglass woven or a fiberglass nonwoven. The foamed region is formed of the elastomer and a plurality of gas-filled, closed cells in the elastomer. According to some embodiments, the reinforcement region is substantially free of gas filled cells, defined by a volume percentage of voids formed by the foaming agent of less than or equal to 10%, preferably less than or equal to 5%. The reinforcement region and the foamed region are connected together by way of the elastomer, forming a composite structure. The reinforcement region provides increased strength to the overall structure of the supported elastomeric foam, while the foamed region is operable to contract under load to provide sealing capabilities with a high working range, i.e., being capable of sealing a gap in an interface at a wide range of clamping pressures or between uneven surfaces.

The disclosure may be better understood with reference to the Figures, in which like parts have like numbering.

FIG. 1 is a side cross sectional view of an embodiment of supported elastomeric foam 100. The elastomeric foam 100 is formed of an elastomeric matrix 102 that includes a reinforcement region 104 and a foamed region 106. As shown herein, the foamed region 106 is positioned adjacent to and above the reinforcement region 104, however, the foamed and reinforcement regions can generally adopt any suitable configuration with respect to one another, e.g., with the reinforcement region at either a top or bottom side of the foamed region, embedded in the foamed region, or as one of multiple reinforcement regions sandwiching or positioned at varying depths in the foamed region. The reinforcement region 104 includes a porous layer generally formed of a polymer, optionally in the form of a polymer membrane, that possess a network of pores, optionally an interconnected matrix of nodes and fibrils, or only fibrils, into which an elastomer forming the elastomeric matrix 102 is at least partially imbibed. The foamed region 106 is expanded by way of a series of closed-cell, gas-filled voids 108 in the elastomer formed by way of a foaming agent in the elastomer or in an elastomer precursor that forms the elastomeric matrix. In some embodiments, the foaming agent used to expand the foamed region is mixed with the elastomer and is formed of particles that are larger than a pore size of the porous layer positioned in the reinforcement region 104. Thus, foaming agent is generally excluded from the reinforcement region 104, preventing expansion of voids 108 within the reinforcement region. Thus, although voids 108 may abut the reinforcement region 104, the reinforcement region will remain substantially devoid of large voids formed by the foaming agent. The closed cell, gas-filled voids can vary in size according to the foaming agent selected. According to some embodiments, the voids have an average cell size ranging from diameters of about 5 µm to 700 µm as measured by SEM cross section. According to certain embodiments, the average cell size of the voids 108, by diameter, can vary from 5 µm to 100 µm, or from 5 µm to 50 µm. Suitable foaming agents can include heat activated expanding polymer spheres, hollow sphere fillers, heat activated chemical foaming agents, gas injection foaming agents, or the like.

A total thickness 114 of the supported elastomeric foam 100 can include a first thickness 110 corresponding to the reinforcement region 104 and a second thickness 112 corresponding to the foamed region 106. According to certain embodiments, the total thickness 114 at a pressure of about 0.5 kPa can vary from about 100 µm to about 2000 µm (2.0 mm), e.g., from 200 µm to 600 µm, or from 220 µm to 380 µm. A ratio between the first thickness 110 of the reinforcement region 104 to the total thickness 114 may optionally vary from 1% to 50%, of the total thickness, e.g., from 2% to 20%, or from 4% to 8%.

According to some embodiments, the reinforcement region 104 includes a fluoropolymer membrane. In some specific embodiments, the reinforcement region includes an expanded polytetrafluoroethylene (ePTFE) membrane. Such ePTFE membranes are advantageously strong and chemically resistant, while being sufficiently porous to imbibe a liquid elastomer or elastomer precursor in order to form the elastomeric matrix 102. In some specific embodiments, a suitable ePTFE membrane can have a thickness on the order of 1 µm to 100 µm, e.g., 4 µm to 40 µm, or about 34 µm, a density on the order of 0.02 to 1.5 $g/cm^3$, e.g. 0.1 to 0.5 $g/cm^3$ or about 0.27 $g/cm^3$, porosity on the order of on the order of 30% to 98%, e.g. 80-95%, or about 88%, and matrix tensile strengths of from 30 MPa to 1500 MPa, e.g. from 240 MPa to 440 MPa, or at least 320 MPa in a first direction and at least 30 MPa to 1500 MPa, e.g. from 130 MPa to 350 MPa, or at least 160 MPa in a second direction. The matrix tensile strengths described herein refer to orthogonal directions on the film defined by referencing the cross-sectional area of the polymer only, not the pore structure or total cross-sectional area. Generally, the matrix tensile strengths refer to the strength in a direction of maximum strength and the strength in a direction orthogonal to that maximum. According to various embodiments, suitable ePTFE membranes can vary in thickness down to about 8 µm or thinner, with densities ranging down to about 0.18 $g/cm^3$. Suitable ePTFE membranes can be made, in accordance with embodiments, according to methods as discussed in, e.g., U.S. Pat. No. 3,953,566, which is hereby incorporated by reference. In alternative embodiments, the reinforcement region 104 can include a non-ePTFE porous layer, such as an alternative porous polymer membrane, a woven or nonwoven fibrous mat, a fiberglass woven or nonwoven, or the like. For example, in some embodiments, the reinforcement region 104 is a polyether ether ketone (PEEK) woven. One suitable PEEK woven is a high-temperature chemical-resistant PEEK mesh, such as PEEK mesh, part no. 9289T12 (McMaster-Carr, Santa Fe Springs, Calif.), which is formed of PEEK plastic in a woven mesh of a plastic wire having diameter of 60 to 80 µm, e.g., from about 65 to 75 µm or about 71 µm and an open area of 12 to 32%, e.g., 15 to 29% or approximately 22%. However, various other PEEK wovens, nonwovens, or other, similar porous polymer layers may be used.

According to some embodiments, the supported elastomeric foam 100 can be stacked together with additional foam elements or with spacers to seal an interface if the foam alone is not sufficiently thick to span the interface. For example, the first and/or second faces 120, 118 of the supported elastomeric foam 100 can be connected with spacers, washers, or with additional elastomeric foam composites. In some cases, the first or second faces 120, 118 may be treated, e.g., with adhesive or other material, to improve a connection between the elastomeric foam with a sealed component.

Figure 2:
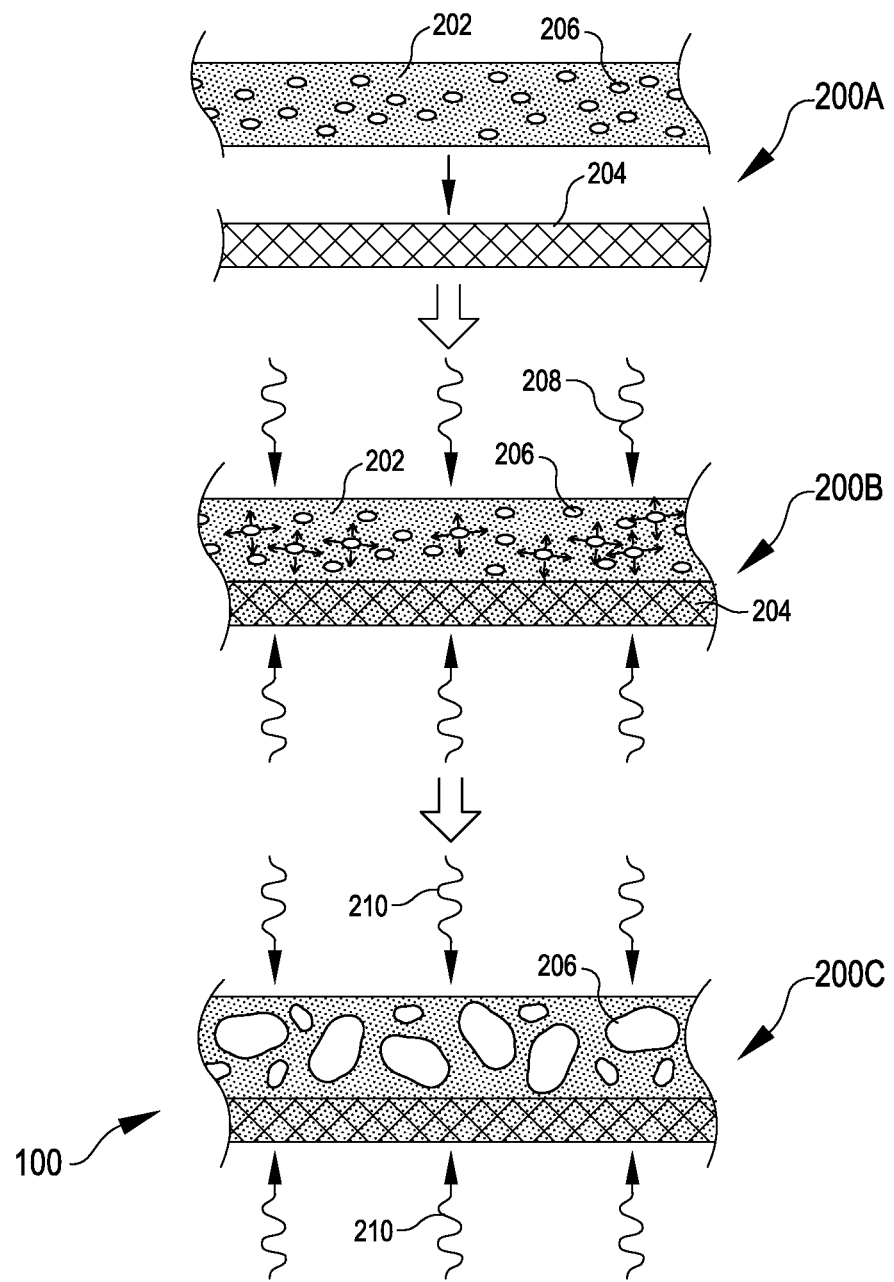
FIG. 2 is a side cross sectional view showing example steps for generating supported elastomeric foam.

FIG. 2 is a side cross sectional view showing example steps for generating a supported elastomeric foam. In accordance with some embodiments, a porous layer 204, which will become the reinforcement region in the ultimately formed supported elastomeric foam, is provided or prepared having a porous microstructure, and combined with a liquid elastomer mixture 202, in a first process step 200a. The porous layer 204 can be placed in tension, e.g., within a frame, until the layer adopts a flat, wrinkle-free state before being cast with the liquid elastomer mixture 202. The liquid elastomer mixture 202 can include a foaming agent, which may be a chemical foaming agent diffused throughout the mixture, or which may be a powdered, dry foaming agent 206 mixed throughout the elastomer 202. In some embodiments, the foaming agent 206 and elastomer 202 are mixed to a target mass fraction by weighing each component when mixing. The foaming agent 206 may include a combination of different foaming agents having different properties, e.g., foaming agents designed to produce differently sized gas cavities. If a second reinforcing region is used for the specific supported elastomeric foam, a second porous layer can be tensioned and then laid on top of the liquid elastomer mixture 202 and allowed to cast with the liquid elastomer mixture until the liquid elastomer mixture has been imbibed into the pores of the second porous layer.

The liquid elastomer mixture 202 is cast with the tensioned porous layer 204 and allowed to wet or fill some or all of the porous layer until the porous layer is at least partially imbibed (i.e., filled) with elastomer, i.e. until at least some pores throughout the thickness of the porous layer are filled with the elastomer mixture (leaving few if any isolated gas pockets in the porous structure of the reinforcing layer), or fully imbibed (in which case no gas remains in the pores of the porous layer 204). Once assembled, the reinforcing region(s) and liquid elastomer layer are optionally set to a predetermined thickness by any suitable combination of processing steps including, but not limited to, the selected coating method (e.g., rolling, brushing, spraying), liquid elastomer removal (e.g. by passing the assembly through a tool gap), or process parameters (e.g., line speed, tool gap, etc.). The composition is then subjected to a first, foaming heating cycle 208 to activate the foaming agent 206 in a second process step 200b. The specific parameters of the foaming heating cycle 208 can also impact the final thickness of the composition, depending on the concentration of foaming agent used, and on the degree and duration of heat exposure. Depending on the foaming agent chosen, the first heating cycle 208 may be skipped or conducted at room temperature, i.e., for a contact or room-temperature foaming agent, or when the foaming agent is operable to activate fully at a curing temperature for the entire supported foam. In some embodiments, a specific heating cycle may be required to activate the foaming agent 206. For example, in some cases the assembly can be heat-cycled at a temperature of from 125 to 175° C., e.g., at about 150° C. for 1 to 10 minutes. According to some embodiments, the first, foaming heating cycle 208 can at least partially cure the elastomeric matrix. In some embodiments, various parameters of the foaming heating cycle 208 can be adjusted to maintain at least a degree of mobility in the partially cured elastomer during the foaming process, in order to avoid cracking, deformation, or other issues.

Once the liquid elastomer mixture has been expanded via the embedded foaming agent 206, the elastomer can be cured in place by way of a curing heat cycle 210 to solidify the elastomer mixture into an elastomeric foam matrix in a third process step 200c. Depending on the specific foaming agent and liquid elastomer mixture chosen, the curing step may not require temperatures above room temperature. However, in some cases, the curing step may require a different action as dictated by the specific elastomer, such as UV exposure. According to some embodiments, the curing step can include heating the liquid mixture to a curing temperature of approximately 75° C. to 125° C. for 5 to 180 minutes. In alternative embodiments, multiple membranes may be added to create multiple reinforcement regions, for example, reinforcement regions on both sides of the composite as discussed with reference to FIG. 3.

Figure 3:
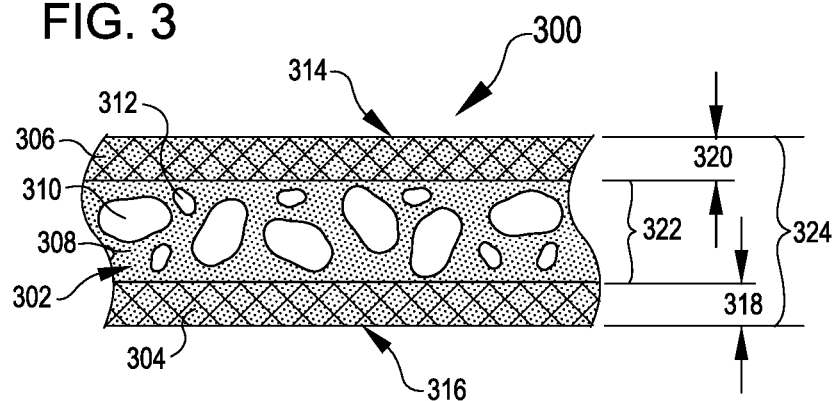
FIG. 3 is a side cross-sectional view showing a second embodiment of supported elastomeric foam.

FIG. 3 is a side cross-sectional view showing a second embodiment of supported elastomeric foam 300 having dual reinforcement regions 304, 306. Each reinforcement region 304, 306 is formed in a similar manner to reinforcement region 104 discussed above with reference to FIG. 1, with an intervening foamed region 308 similar to foamed region 106. An elastomer matrix 302 penetrates throughout both of the reinforcement regions 304, 306 and throughout the foamed region 308. The foamed region 308 is expanded by closed-cell, gas-filled voids 310, 312, similar to the voids 108 described above with reference to FIG. 1. Notably, voids 310, 312 can include voids of different sizes, which may be formed using different foaming agents mixed together with the elastomer. As shown, larger voids 310 can be interspersed with smaller voids 312. A mixture of large and small voids 310, 312 can be used to promote more complete expansion of the foamed region 308 caused by the arrangement of the large and small voids, which will naturally orient to form in a packed structure as voids interact during expansion. A total thickness 324 of the elastomeric matrix 302 includes respective first and second thicknesses 318, 320 of the first and second reinforcement regions 304, 306 and a third thickness 322 of the foamed region 308. According to some embodiments, the first and second thicknesses 318, 320 can vary from about 1 µm to 100 µm, e.g. 4 µm to 40 µm or about 34 µm. According to some specific embodiments, the total thickness 324 can vary from about 100 µm to about 2000 µm. According to some embodiments, the first or second faces 316, 314 of the supported elastomeric foam 300 can be connected with spacers, washers, or with additional elastomeric foam composites for a total thickness protectable by the supported elastomeric foam. In some cases, the first or second faces 316, 314 may be treated, e.g. with adhesive or other material, to improve a connection between the elastomeric foam with a sealed component.

Figure 4A:
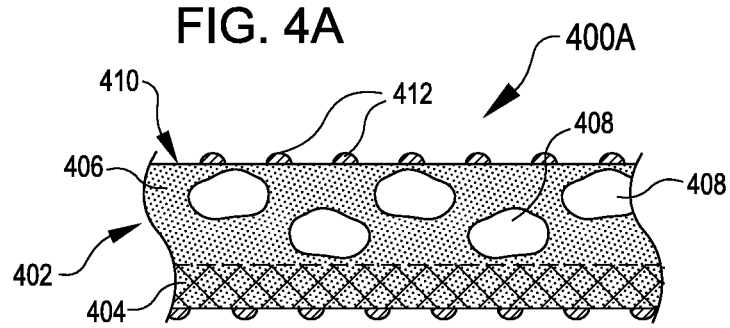
FIG. 4A is a side cross-sectional view showing an embodiment of supported elastomeric foam dotted with an adhesive.

FIG. 4A is a side cross-sectional view showing an embodiment of supported elastomeric foam 400A dotted with multiple adhesive regions 412. The supported elastomeric foam 400A includes an elastomeric matrix 402 made up of a reinforcement region 404 and a foamed region 406 containing closed-cell voids 408 throughout, in accordance with embodiments and as described above. The adhesive regions 412 may be printed, cast, or otherwise individually deposited along any suitable surface 410 of the supported elastomeric foam 400A, including adjacent the reinforcement region 404, adjacent the foamed region 406, or both. In alternative embodiments of supported elastomeric foams that employ two reinforcement regions sandwiching a foamed region, the adhesive regions 412 may be positioned adjacent one or both reinforcement regions. In use, the adhesive regions 412 are pressed into the elastomeric matrix 402 when the supported elastomeric foam 400A is compressed, so that the adhesive regions and elastomeric matrix are brought roughly flush with one another and with an interface surface. Even if small pockets of air form directly adjacent adhesive regions 412, intervening space between the adhesive regions will inhibit transverse liquid intrusion along the supported elastomeric foam 400A. Thus, liquid intrusion is inhibited or prevented at most to all of the adhesive regions 412, preventing chemical attack of the adhesive regions.

Figure 4B:
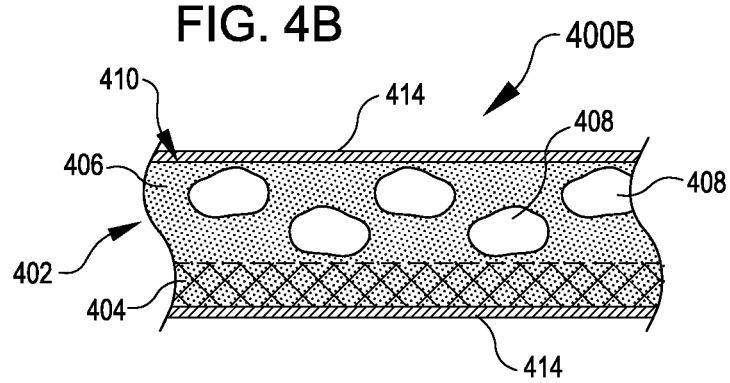
FIG. 4B is a side cross-sectional view showing an embodiment of supported elastomeric foam with an adhesive layer.

Embodiments of supported elastomeric foams can also employ adhesive films or full surface treatments. For example, FIG. 4B is a side cross-sectional view showing an embodiment of supported elastomeric foam 400B with adhesive layers 414 that cover an entire surface 410 of the supported elastomeric foam. The adhesive layers 414 may be printed, cast, or otherwise deposited along any suitable surface 410 of the supported elastomeric foam 400B, including adjacent the reinforcement region 404, adjacent the foamed region 406, or both. In alternative embodiments of supported elastomeric foams that employ two reinforcement regions sandwiching a foamed region, the adhesive layers 414 may be positioned adjacent one or both reinforcement regions. According to some embodiments, an adhesive can be applied to an entire face of supported elastomeric foam via transfer tape, lamination, or other comparable means. One suitable adhesive is ARSEAL 8026 (Adhesives Research, Glen Rock, Pa.), which can be applied by way of a transfer tape, either by way of firm hand pressure or lamination pressure.

Figure 5:
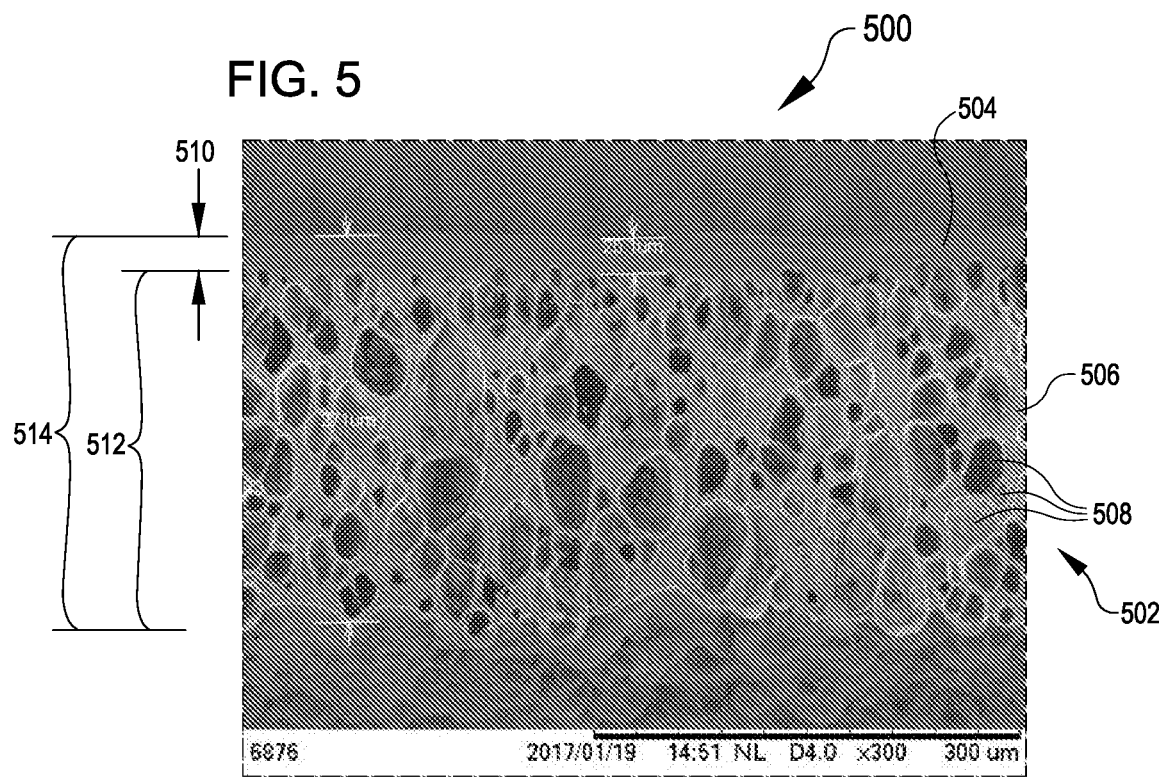
FIG. 5 is a scanning electron micrograph (SEM) image showing a first example of supported elastomeric foam with a single reinforcing membrane.
Figure 6:
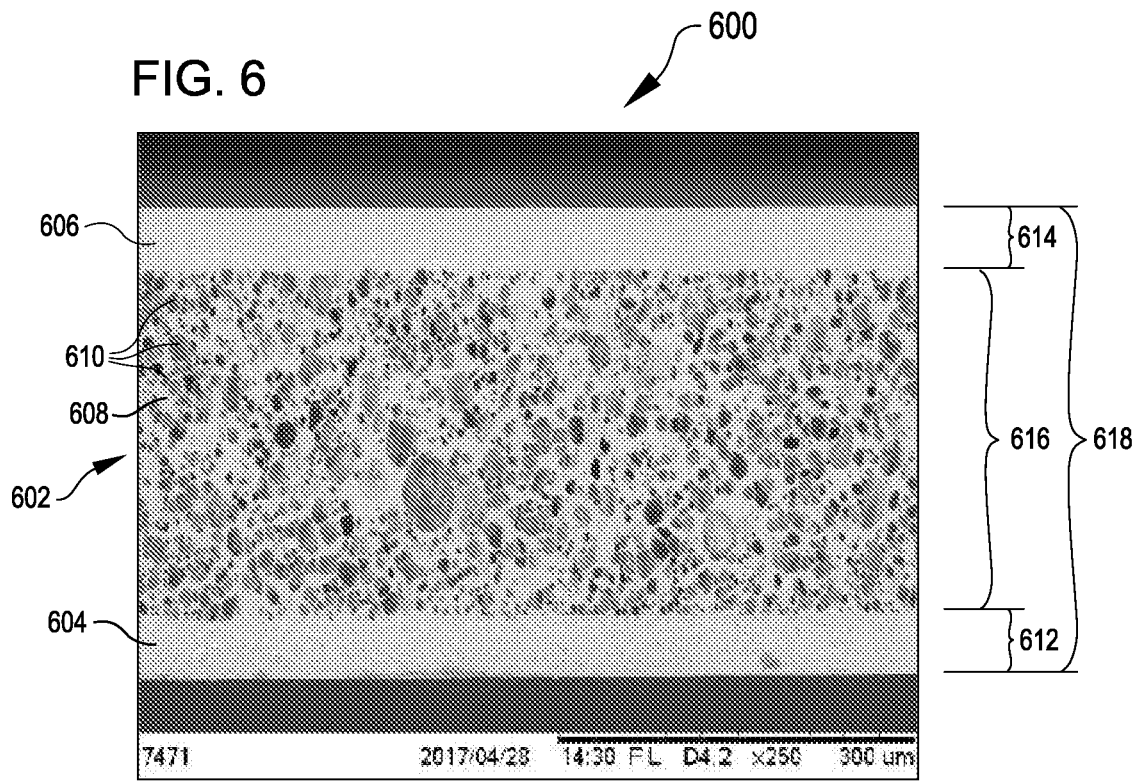
FIG. 6 is an SEM image showing a second example of supported elastomeric foam with dual reinforcing membranes.

Embodiments of supported elastomeric foams are shown in detail in scanning electron micrograph (SEM) images reproduced in FIGS. 5-7.

FIG. 5 is a first scanning electron micrograph (SEM) image 500 showing a first example of supported elastomeric foam 502 with a single reinforcement region 510 and a foamed region 506. The foamed region 506 contains many gas-filled voids 508 which fill most of the total thickness 514 of the supported elastomeric foam 502. A first thickness 510 of the reinforcement region 504 is approximately 25 µm, the total thickness 514 of the supported elastomeric foam 502 is approximately 270 µm, and a second thickness 512 of the foamed region 506 is approximately 245 µm.

FIG. 6 is a second SEM image 600 showing a second example of supported elastomeric foam 602 at 250× magnification with dual reinforcement regions 604, 606 sandwiching a foamed region 608. As described above, the foamed region 608 contains many gas-filled voids 610 throughout. The reinforcement regions 604, 606 are defined by first and second thicknesses 612, 614 of approximately 50 and 52 µm, respectively. A third thickness 616 of the foamed region 608 is approximately 275 µm, resulting in a total thickness 618 of the supported elastomeric foam 602 of about 377 µm.

Figure 7A:
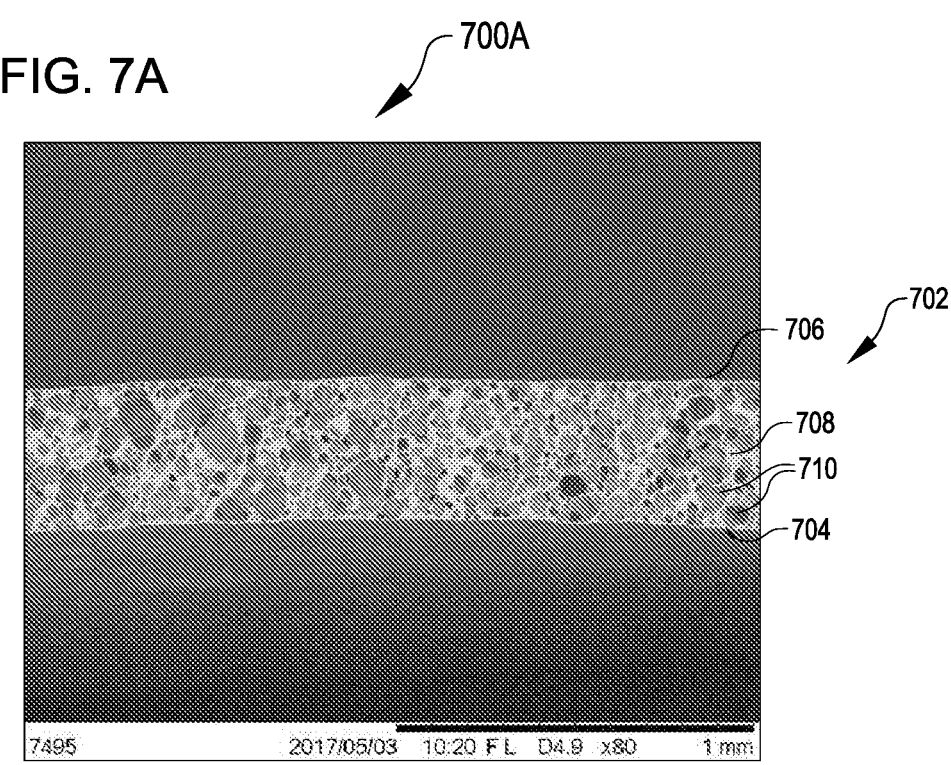
FIG. 7A is an SEM image showing a third example of a supported elastomeric foam with dual reinforcing membranes.
Figure 7B:
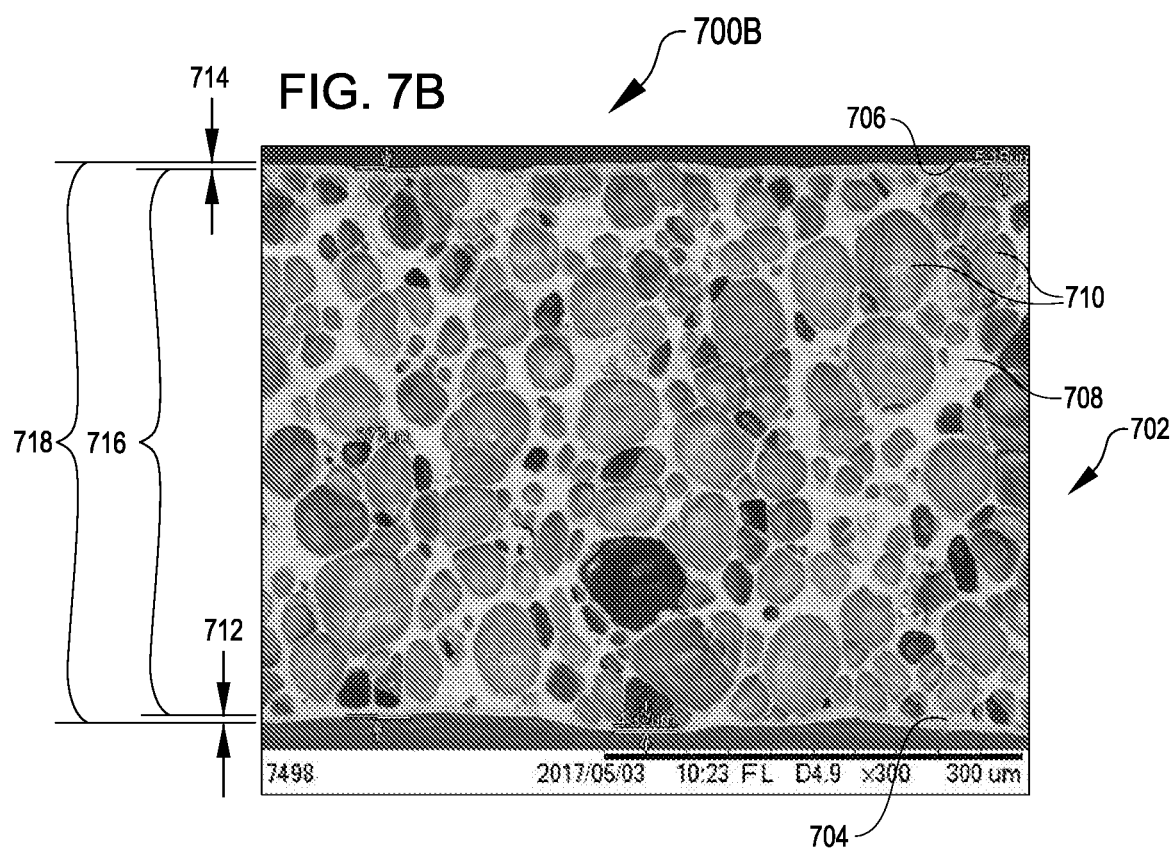
FIG. 7B is an SEM image showing the supported elastomeric foam of FIG. 7A in greater detail.

FIGS. 7A and 7B show different views of a third example of supported elastomeric foam 702. FIG. 7A is a third SEM image 700A showing the supported elastomeric foam 702 with dual reinforcement regions 704, 706 sandwiching a foamed region 708 containing many gas-filled voids 710. FIG. 7B is a fourth SEM image 700B showing the supported elastomeric foam 702 of FIG. 7A in greater detail, in which first and second thicknesses 712, 714 of the first and second reinforcement regions 702, 706 are visible (at approximately 45 µm). A third thickness 716 of the foamed region 708 is approximately 368 µm, the first, second, and third thicknesses add to a total thickness 718 of the supported elastomeric foam 702 of approximately 377 µm.

As discussed above with reference to FIGS. 4A and 4B, an adhesive layer can be applied to one or both faces of a compressible seal to aid in placement of the seal during manufacturing of an assembly. According to various embodiments, the adhesive layer may be applied to a compressible seal formed of an elastomeric foam, such as the supported elastomeric foams described above; or with a seal formed from another suitable compressible material. Using an adhesive with the seal can provide advantages during installation, e.g., allowing a technician to affix the seal to a mounting location where it might otherwise fall, and then fixing a mating surface to the seal and tightening any fasteners. As shown in FIG. 4A, a discontinuous adhesive (412) can be added to achieve these advantages without compromising liquid compatibility of the seal. In the case of a continuous adhesive layer (e.g., adhesive layer 414 shown in FIG. 4B), the edges of the adhesive layer(s) and elastomeric foam are exposed to the challenge fluid. If the adhesive has less chemical compatibility than the elastomeric foam, the adhesive could allow wetting into the interface by allowing the challenge fluid to wick into the adhesive layer, by the adhesive layer dissolving in the fluid and becoming replaced with the fluid, or by other mechanisms. In contrast, by utilizing a discontinuous adhesive layer (e.g. adhesive regions 412, as shown in FIG. 4A), an elastomeric foam in a sealed interface will form a liquid tight seal to the challenge fluid, since the bulk foam is chemically stable in the challenge fluid. Therefore, only discrete sections of adhesive exposed at the edge of the seal will allow for fluid ingress and the bulk elastomeric foam will allow for the adhesive to be protected from the fluid. In accordance with various embodiments, any suitable elastomeric foam as described herein may be combined with a surface adhesive for securing the elastomeric foam when used to seal an interface. According to some alternative embodiments, discontinuous adhesive regions can be applied to other types of compressible dry sealants than supported elastomeric foams, e.g., compressible rubber sealants, gaskets, foams, or the like. According to some embodiments, elastomeric foam can include applied discontinuous adhesive regions, i.e. adhesive "dots," as described above with respect to FIG. 4. Specific examples of discontinuous adhesive regions, and their use in a sealing operation, are described below with reference to FIGS. 8-10.

Figure 8:
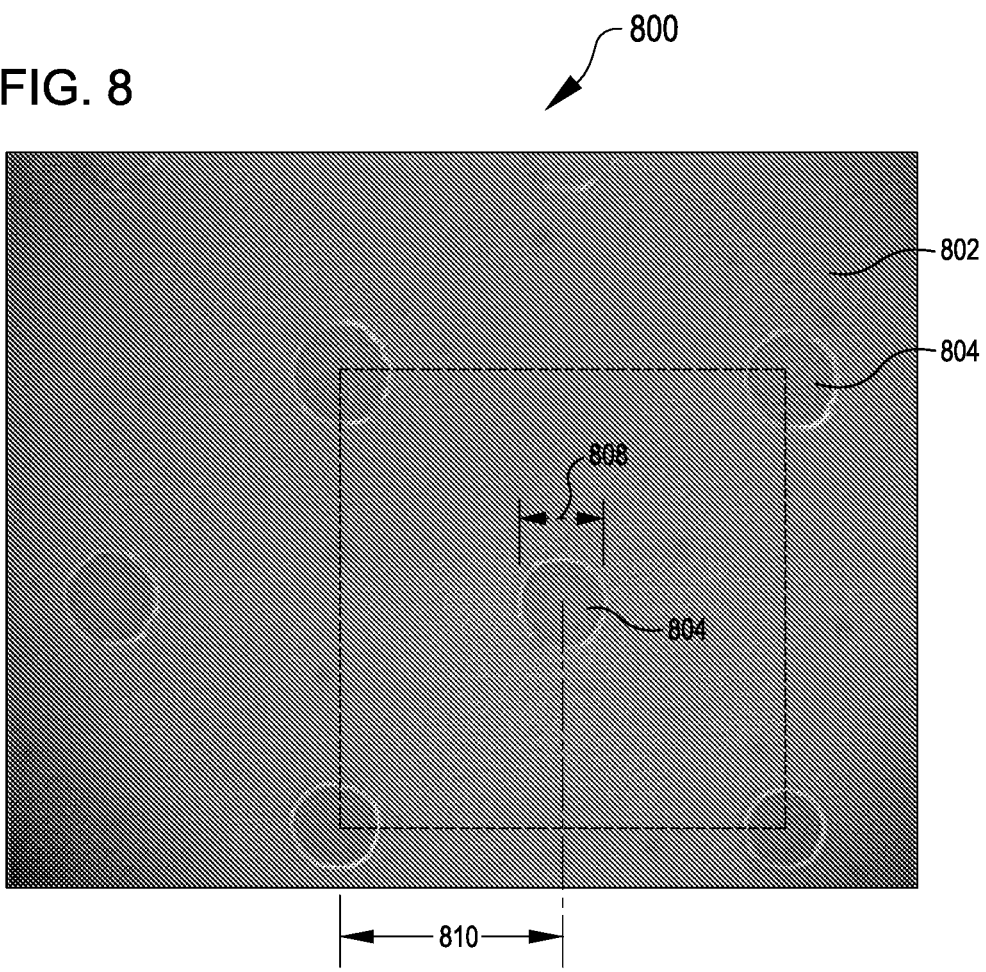
FIG. 8 is a microscope image showing an example of a supported elastomeric foam dotted with a discontinuous adhesive.

FIG. 8 is a top surface image 800 of a seal 802 taken at a magnification of 10X. A dot patterned, pressure sensitive adhesive 804 is adhered to a facing surface of the seal 802. The patterned adhesive 804 shows each adhesive "dot" as having a diameter of about 0.97 mm and edge to edge spacing of each dot to the next closest dot as about 2.19 mm. According to embodiments, the seal 802 is a supported elastomeric foam having two reinforcement regions that sandwich a foamed region; however, the discontinuous, patterned adhesive 804 may be applied in similar manner to any suitable elastomeric foam (e.g., with one reinforcement region), or to an alternative compressible sealing material. The configuration of the patterned adhesive 804 can be characterized in terms of dot diameters 808 and unit cell widths 810, and a percent coverage of the seal 802 can be determined from these values according to the following equation, where U represents the unit cell width 810 and D represents the "dot" width.

Proportional Coverage $$C = \frac{\pi D^2}{8U^2} \text{ (For circular "dots")} \quad C = \frac{D^2}{2U^2} \text{ (For square "dots")} \quad \text{Equation 1}$$

Figure 9:
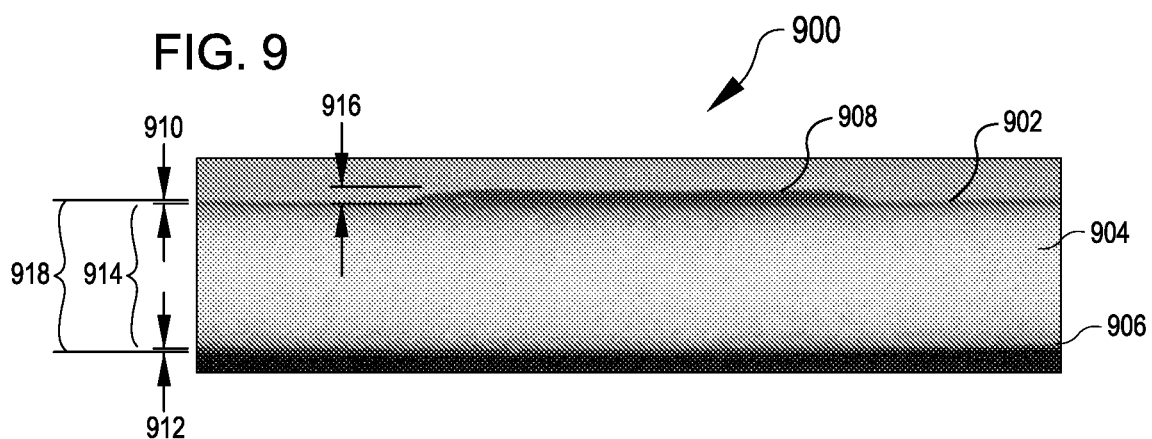
FIG. 9 is a microscope image showing a side view of the supported elastomeric foam and discontinuous adhesive of FIG. 8.

FIG. 9 is an image of a cross-section of a supported elastomeric foam 900 (corresponding to the foam 800 of FIG. 8) with a discontinuous adhesive region 908, taken at a magnification of 57X. For the cross-section, the sample was cut with a liquid nitrogen dipped steel razor blade in an effort to preserve the cross-sectioned surface before imaging. The supported elastomeric foam 900 for this sample includes two reinforcement regions 902, 906, one on each face, and a dot patterned, discontinuous pressure sensitive adhesive 908 on one of those faces. Each of the two support regions 902, 906 utilizes an ePTFE porous layer having an initial thickness of about 16 μm and an initial density of about 0.28 g/cm³. A perfluoropolyether elastomer, SIFEL 2618 was selected as the elastomer and mixed with EXPAN-CEL 920 DU 20 expanding polymer spheres as the foaming agent, in a 6.5:01 (13:02) mixing ratio by mass. The mixture was imbibed into both of the ePTFE porous layers at the reinforcement regions 902, 906 and drawn down with a tool gap of 0.076 mm before being heat treated at 150° C. for 10 minutes to activate the foaming agent and begin the elastomer cure. The composite was then heat treated at 100° C. for 60 minutes to complete the cure and form the supported elastomeric foam 900. A pattern of pressure sensitive adhesive was applied to the supported elastomeric foam 900 using a sheet of stainless steel about 0.025 mm thick with a pattern of through-holes through which the discontinuous adhesive 908 was applied. The specific adhesive used for this pattern was PSA-16 (Silicone Solutions, Ltd., Cuyahoga Falls, Ohio, USA). The PSA-16 adhesive includes a two-part mixture, and was prepared by mixing two Part A and Part B in a 16:01 ratio by mass. The mixed PSA-16 was applied on top of the steel sheet and the supported elastomer foam underneath the steel was selectively coated with the liquid adhesive. The adhesive-coated elastomeric foam 900 was then heat treated at 125° C. for 75 mins to cure the adhesive. The final dimensions of the adhesive-coated elastomeric foam 900 include reinforcing region thicknesses 910, 912 of the reinforcement regions 902, 906 of about 12-13 μm; and a foamed region thickness 914 of about 251 μm. The discontinuous adhesive 908 has a thickness 916 of about 30 μm. In use, the adhesive-coated elastomeric foam 900 can deform under pressure, so that the discontinuous adhesive 908 is surrounded by the elastomeric matrix, preventing fluid ingress to the adhesive, as shown below with reference to FIG. 10.

FIG. 10 shows a side cross-sectional view showing an embodiment of supported elastomeric foam 1002 with discontinuous adhesive regions 1012, 1014 undergoing compression. In a first, uncompressed configuration 1000a, the supported elastomeric foam 1002 is positioned between but not contacted by two rigid surfaces 1020, 1022. The supported elastomeric foam 1002 includes a reinforcement region 1004 positioned along one side, and a foamed region 1006 positioned along an opposite side, with voids 1008 formed throughout the foamed region to impart compressibility. A first set of discontinuous adhesive regions 1012 are located on a first surface 1016 of the supported elastomeric foam 1002, and a seconds et for discontinuous adhesive regions 1014 are located on a second surface 1018 of the supported elastomeric foam. Before compression, each of the reinforcement region 1004 and foamed region 1006 have initial thicknesses 1032a, 1034a totaling an initial, total thickness 1030a.

When the supported elastomeric foam 1002 is compressed, in a second, compressed configuration 1000b, portions of the first and second surface 1016, 1018 are pressed into contact with the first and second rigid surfaces 1020, 1022, while small pockets 1036 are formed around each of the adhesive regions 1006 compressing into the elastomeric foam. The contact between the first and second surfaces 1016, 1018 and the first and second rigid surfaces 1020, 1022 creates a seal against liquid intrusion along those surfaces. After compression, each of the reinforcement region 1004 and foamed region 1006 have compressed thicknesses 1032b, 1034b totaling a compressed total thickness 1030b which is smaller than the initial, uncompressed thickness 1030a. Generally, the foamed region 1006 will compress to a greater degree than the reinforcement region 1004.

Further details regarding the disclosure are described in conjunction with the following examples.

Supported Elastomeric Foam Examples

Example 1

According to a first example, supported elastomeric foam was formed using a single ePTFE porous layer having an initial thickness of about 34 μm and density of about 0.27 g/cm³, to form a reinforcement region supporting a foamed region on one side. A perfluoropolyether elastomer, SIFEL 2618 (Shin-Etsu Chemical Co., Ltd., Tokyo, JP) was selected as the elastomer and mixed with EXPANCEL 951 DU 120 expanding polymer spheres (Expancel, Sundsvall, Sweden) as the foaming agent, in a 15:01 mixing ratio by mass. The mixture was imbibed in the ePTFE porous layer and drawn down with a tool gap of 1.321 mm before being heat treated at 150° C. for 10 minutes to activate the foaming agent. Once expanded, the composite was cured at 100° C. for 60 minutes.

Example 2

According to a second example, supported elastomeric foam was formed using a single ePTFE porous layer having an initial thickness of about 34 μm and density of about 0.27 g/cm³, to form a reinforcement region supporting a foamed region on one side. A perfluoropolyether elastomer, SIFEL 2618 (Shin-Etsu Chemical Co., Ltd., Tokyo, JP) was selected as the elastomer and mixed with EXPANCEL 920 DU 20 expanding polymer spheres (Expancel, Sundsvall, Sweden) as the foaming agent, in a 10:01 mixing ratio by mass. The mixture was imbibed in the ePTFE porous layer and drawn down with a tool gap of 0.229 mm before being heat treated at 150° C. for 10 minutes to activate the foaming agent. Once expanded, the composite was cured at 100° C. for 60 minutes.

Example 3

According to a third example, supported elastomeric foam was formed using a single ePTFE porous layer having an initial thickness of about 34 μm and density of about 0.27 g/cm$^3$, to form a reinforcement region supporting a foamed region on one side. A perfluoropolyether elastomer, SIFEL 2618 (Shin-Etsu Chemical Co., Ltd., Tokyo, JP) was selected as the elastomer and mixed with a combination of EXPANCEL 951 DU 120 and EXPANCEL 920 DU 40 expanding polymer spheres (Expancel, Sundsvall, Sweden) as the foaming agent, in a 10:01 mixing ratio by mass. The ratio of 951 DU 120 to 920 DU 40 was 1:2 by mass. The mixture was imbibed in the ePTFE porous layer and drawn down with a tool gap of 0.178 mm before being heat treated at 150° C. for 10 minutes to activate the foaming agent. Once expanded, the composite was cured at 100° C. for 60 minutes.

Example 4

According to a fourth example, supported elastomeric foam was formed using a single ePTFE porous layer having an initial thickness of about 34 μm and density of about 0.27 g/cm$^3$, to form a reinforcement region supporting a foamed region on one side. A silicone elastomer, SS-156 (Silicone Solutions, Ltd., Cuyahoga Falls, Ohio, USA) was selected as the elastomer and mixed with EXPANCEL 920 DU 20 expanding polymer spheres (Expancel, Sundsvall, Sweden) as the foaming agent, in a 10:01 mixing ratio by mass. The mixture was imbibed in the ePTFE porous layer and drawn down with a tool gap of 0.229 mm before being heat treated at 150° C. for 10 minutes to activate the foaming agent. Once expanded, the composite was cured at 110° C. for 30 minutes.

Example 5

According to a fifth example, supported elastomeric foam was formed using a single ePTFE porous layer having an initial thickness of about 34 μm and density of about 0.27 g/cm$^3$, to form a reinforcement region supporting a foamed region on one side. A silicone elastomer, SS-2600 (Silicone Solutions, Ltd., Cuyahoga Falls, Ohio, USA) was selected as the elastomer, which includes a premixed foaming agent. The mixture was imbibed in the ePTFE porous layer and drawn down with a tool gap of 1.321 mm. The cast assembly was allowed to foam and cure at room temperature for 120 minutes.

Example 6

According to a sixth example, a supported elastomeric foam was formed using a single ePTFE porous layer having an initial thickness of about 8 μm and density of about 0.18 g/cm$^3$ to form a reinforcement region supporting a foamed region on one side. A perfluoropolyether elastomer, SIFEL 2618 (Shin-Etsu Chemical Co., Ltd., Tokyo, JP) was selected as the elastomer and mixed with a combination of EXPANCEL 951 DU 120 and EXPANCEL 920 DU 40 expanding polymer spheres (Expancel, Sundsvall, Sweden) as the foaming agent, in a 10:01 mixing ratio by mass. The ratio of 951 DU 120 to 920 DU 40 was 1:2 by mass. The mixture was imbibed in the ePTFE porous layer and drawn down with a tool gap of 0.178 mm before being heat treated at 150° C. for 10 minutes to activate the foaming agent. Once expanded, the composite was cured at 100° C. for 60 minutes.

Example 7

According to a seventh example, a supported elastomeric foam was formed using a polyether ether ketone (PEEK) woven porous layer having an initial thickness of about 71 μm and an open area of approximately 22% to form a reinforcement region supporting a foamed region on one side. A perfluoropolyether elastomer, SIFEL 2618 (Shin-Etsu Chemical Co., Ltd., Tokyo, JP) was selected as the elastomer and mixed with EXPANCEL 951 DU 120 expanding polymer spheres (Expancel, Sundsvall, Sweden) as the foaming agent, in a 15:01 mixing ratio by mass. The mixture was imbibed in the porous layer and drawn down with a tool gap of 1.321 mm before being heat treated at 150° C. for 10 minutes to activate the foaming agent. Once expanded, the composite was cured at 100° C. for 60 minutes. A release liner was applied to the composite prior to both of the heating cycles, underneath the porous layer at the reinforcement region, to prevent the liquid mixture from dripping through the porous layer before it was cured.

Example 8

According to an eighth example, a supported elastomeric foam was formed using two ePTFE porous layers, each having an initial thickness of about 8 μm and density of about 0.18 g/cm$^3$, to form two reinforcement regions supporting a foamed region on both sides in a sandwiched configuration. A perfluoropolyether elastomer, SIFEL 2618 (Shin-Etsu Chemical Co., Ltd., Tokyo, JP) was selected as the elastomer and mixed with a combination of EXPANCEL 951 DU 120 and EXPANCEL 920 DU 40 expanding polymer spheres (Expancel, Sundsvall, Sweden) as the foaming agent, in a 10:01 mixing ratio by mass. The ratio of 951 DU 120 to 920 DU 40 was 1:2 by mass. The mixture was imbibed into both of the ePTFE porous layers and drawn down with a tool gap of 0.178 mm before being heat treated at 150° C. for 10 minutes to activate the foaming agent. Once expanded, the composite was cured at 100° C. for 60 minutes.

Example 9

According to a ninth example, a supported elastomeric foam was formed using two ePTFE porous layers, each having an initial thickness of about 34 μm and density of about 0.27 g/cm$^3$, to form two reinforcement regions supporting a foamed region on both sides in a sandwiched configuration. A perfluoropolyether elastomer, SIFEL 2618 (Shin-Etsu Chemical Co., Ltd., Tokyo, JP) was selected as the elastomer and mixed with EXPANCEL 920 DU 20 expanding polymer spheres (Expancel, Sundsvall, Sweden) as the foaming agent, in a 10:01 mixing ratio by mass. The mixture was imbibed into both of the ePTFE porous layers and drawn down with a tool gap of 0.229 mm before being heat treated at 150° C. for 10 minutes to activate the foaming agent. Once expanded, the composite was cured at 100° C. for 60 minutes.

Example 10

According to a tenth example, a supported elastomeric foam was formed using two ePTFE porous layers, each having an initial thickness of about 34 µm and density of about 0.27 g/cm³, to form two reinforcement regions supporting a foamed region on both sides in a sandwiched configuration. A silicone elastomer, SS-156 (Silicone Solutions, Ltd., Cuyahoga Falls, Ohio, USA) was selected as the elastomer and mixed with EXPANCEL 920 DU 20 expanding polymer spheres (Expancel, Sundsvall, Sweden) as the foaming agent, in a 10:01 mixing ratio by mass. The mixture was imbibed in both of the ePTFE porous layers and drawn down with a tool gap of 0.229 mm before being heat treated at 150° C. for 10 minutes to activate the foaming agent. Once expanded, the composite was cured at 110° C. for 30 minutes.

Example 11

According to an eleventh example, a supported elastomeric foam was formed using two ePTFE porous layers, each having an initial thickness of about 8 µm and density of about 0.18 g/cm³, to form two reinforcement regions supporting a foamed region on both sides in a sandwiched configuration. A perfluoropolyether elastomer, SIFEL 2661 (Shin-Etsu Chemical Co., Ltd., Tokyo, JP) was selected as the elastomer and mixed with a combination of EXPANCEL 951 DU 120 and EXPANCEL 920 DU 40 expanding polymer spheres (Expancel, Sundsvall, Sweden) as the foaming agent, in a 10:01 mixing ratio by mass. The ratio of 951 DU 120 to 920 DU 40 was 1:2 by mass. The mixture was imbibed in the ePTFE porous layer and drawn down with a tool gap of 0.178 mm before being heat treated at 150° C. for 10 minutes to activate the foaming agent. Once expanded, the composite was cured at 100° C. for 60 minutes.

Example 12

According to a twelfth example, supported elastomeric foam was formed using two ePTFE porous layers, each having an initial thickness of about 34 µm and density of about 0.27 g/cm³, to form two reinforcement regions supporting a foamed region on both sides in a sandwiched configuration. A silicone elastomer, SS-2600 (Silicone Solutions, Ltd., Cuyahoga Falls, Ohio, USA) was selected as the elastomer, which includes a premixed foaming agent. The mixture was imbibed in both of the ePTFE porous layers and drawn down with a tool gap of 1.321 mm. The cast assembly was allowed to foam and cure at room temperature for 120 minutes.

Example 13

According to a thirteenth example, a supported elastomeric foam was formed using two ePTFE porous layers, each having an initial thickness of about 34 µm, and density of about 0.27 g/cm³, to form two reinforcement regions supporting a foamed region on both sides in a sandwiched configuration. A fluorosilicone elastomer, FL 60-9201 (Dow Corning Co., Auburn, Mich., USA) was selected as the elastomer and mixed with EXPANCEL 920 DU 20 expanding polymer spheres (Expancel, Sundsvall, Sweden) as the foaming agent, in a 10:01 mixing ratio by mass. Methyl ethyl ketone (MEK) was added to the mixture of elastomer and foaming agent as a solvent, bringing the mixture to 17% MEK by weight, in order to lower the viscosity of the mixture and ease the process of impregnating the pores of the substrate. The mixture was imbibed in both of the ePTFE porous layers and drawn down with a tool gap of 0.229 mm, then allowed to dry from 2 minutes before being heat treated at 150° C. for 10 minutes to activate the foaming agent. Once expanded, the composite was cured at 100° C. for 60 minutes.

Example 14

According to a fourteenth example, supported elastomeric foam was formed using a single ePTFE porous layer having an initial thickness of about 34 µm and density of about 0.27 g/cm³, to form a reinforcement region supporting a foamed region on one side. A perfluoropolyether elastomer, SIFEL 2618 (Shin-Etsu Chemical Co., Ltd., Tokyo, JP) was selected as the elastomer and mixed with a combination of EXPANCEL 951 DU 120 and EXPANCEL 920 DU 40 expanding polymer spheres (Expancel, Sundsvall, Sweden) as the foaming agent, in a 10:01 mixing ratio by mass. The ratio of 951 DU 120 to 920 DU 40 was 1:2 by mass. The mixture was imbibed in the ePTFE porous layer and drawn down with a tool gap of 0.178 mm before being heat treated at 150 C for 10 minutes to activate the foaming agent. Once expanded, the composite was cured at 100° C. for 60 minutes. Adhesive was applied to the support side of the composite after the elastomer matrix was cured. Circular dots of the silicone pressure sensitive adhesive PSA-16 (Silicone Solutions, Ltd., Cuyahoga Falls, Ohio, USA) were applied as a liquid to the face of the composite and then cured using heat. The liquid adhesive was mixed to a base:catalyst ratio of 16:1, applied to the composite, and then heated to 150° C. for about two minutes to cure.

Various examples of supported elastomeric foams have been described above with reference to examples 1-14. Any of the examples discussed above can be combined with adhesive materials, such as dotted adhesives, printed adhesives, or adhesive films to encourage bonding to surfaces. The example elastomeric foams were tested according to the below-referenced test methods to determine physical attributes, such as part thicknesses and densities, performance criteria such as compressibility (i.e. compressive strain at different applied stresses), and internal structural characteristics such as the ratio of porous layer thickness to the total structure thickness (percent support). Select performance metrics for the referenced examples are discussed below with reference to Tables 1-4.

Test Methods

Thickness, Density, and Percent Compression

To test the physical thickness, density, and percent compression metrics, the following procedures were carried out. First, each sample of supported elastomeric foam was cut with a punch to 2.263 cm diameter, weighed on a precision scale, and then placed on a platen on an INSTRON 5565 dynamic mechanical analyzer (Instron Tool Works, Inc., MA, USA). A compression disc of 1.786 cm diameter was placed on top of the sample. A compressive stress-strain test was begun where the analyzer head moves at a strain rate of 0.06 mm/min until it reaches a load of 0.74 N. Together with the mass and size of compression disc, this resulted in a pressure on the sample of 3.45 kPa. The thickness of the sample was extracted at 0.48 kPa, which is just above the noise floor of the load cell. Using this thickness and the mass measured earlier, the density of each sample was calculated. Once the analyzer reached 0.74 N, it continued compressing the sample at a strain rate of 0.6 mm/min while capturing load data on its load cell to create a stress-strain curve. The compressive strains on the sample were extracted at a pressure of 1 MPa and 16 MPa to represent this curve.

Percent Support

The relative thickness of each reinforcement region, with respect to the total thickness, was measured by visual inspection of a cross section of the supported elastomeric foam, according to the following procedures. Each sample was cut with a liquid nitrogen dipped steel razor blade in an effort to preserve the cross-sectioned surface. These cut samples were mounted to an adhesive and placed in an SEM for measurement. The total thickness of each sample and total thickness of each support layer were measured. The percent support was calculated by dividing the thickness of each reinforcement region by the total thickness of each sample. The size of the voids produced in the foamed region of each sample can be determined by way of visual inspection of the cross-sectioned surface, in which the cross-sectional areas of select voids are visible.

Hysteresis

Each sample was cut with a punch to a predetermined diameter of about 8 mm and placed on a platen on an RS17 Dynamic Mechanical Analyzer (TA Instruments, New Castle, Del., USA). The samples were "loaded" by compressing to a target strain (described below) while measuring stress to generate a stress-strain loading curve. The samples were then "unloaded" by raising the compression disc back to its original location while measuring stress to generate a stress-strain unloading curve. Typically the unloading curves measured a negligible or zero stress at a nominal strain before 0 percent strain was reached. The amount of compressive strain still applied to a sample when there was no longer compressive stress during the unloading curve was extracted as a metric for the sample. The compression set is calculated by taking this unloading strain metric and dividing it by the peak compressive strain on the sample. The total energy difference in the loading and unloading curves was used as an indication of a quantity of mechanical energy that can be stored and returned by each sample instead of being lost during cyclic compression as heat. The total mechanical energy in each loading curve was calculated by approximating the definite integral between 0 percent strain and the peak strain reached by the sample. The total mechanical energy in each unloading curve was calculated by approximating the definite integral between the peak strain reached by the sample and the strain at which zero stress was reached (the compression set). The Percent Strain Energy Maintained was calculated by taking the integral from the unloading curve and dividing it by the integral from the loading curve.

Stress Relaxation

Each sample was cut with a punch to a predetermined diameter of about 8 mm and placed on a platen on RS17 Dynamic Mechanical Analyzer (TA Instruments, New Castle, Del., USA). Each sample was compressed to a target strain while dynamically measuring the material modulus. While holding at this target strain, the material modulus was continuously monitored for a preset length of time before unloading the sample. The Percent Stress Retained was calculated by dividing the modulus measured five minutes after the target strain was reached by the modulus measured at the moment target strain was reached.

Liquid Intrusion/Sealing and Weight Pick Up

Each Ingress sample was cut with a die in a press to a square shape with a centered hole. This cut sample was weighed and captured as a mass before immersion. Each cut sample was compressed between a stainless steel plate and a polished plexiglass plate having the same area dimensions as the sample. Each stackup was held together with a machine bolt and locknut. The percent compression on each sample was calculated by comparing the micrometer measurement of the stackup height without a sample to that measured with an uncompressed and compressed sample. Once the target percent compressions were reached, each stackup was immersed up to the side of the glass plate in JP8 jet fuel and photographed from above through the glass to visually inspect for fluid penetration for a period of 20 hours. After this period, the samples were removed from the bolted interface, surface liquid was gently dried with a paper towel, and the sample was weighed again and captured as a mass after immersion. The % weight pick up is the % difference in the sample mass after immersion and before immersion. The stress at the ingress seal is then estimated by comparing the percent compression to the stress-strain relationship described above.

Test Data

Table 1 refers to structural characteristics of each respective example of Examples 1-14 discussed above. Example thicknesses and densities were obtained at a standard applied pressure of approximately 0.5 kPa, along with comparative examples including Comparative Example 1: polysulfide liquid sealant PR-1782 B2 (PPG Industries, Inc., Pittsburgh, Pa., USA); Comparative Example 2: a fluorosilicone sealant FLUOROSILICONE 50A having a Shore-A hardness of 50 durometer, nominally 1 mm thick; and Comparative Example 3: a simple ePTFE membrane INTERTEX ePTFE available as part no. SQ-S PTFE Sheet Gasket, at 0.5 mm thickness (Inertech, Inc., Monterey Park, Calif., USA). Comparative examples are denoted CE-1, CE-2, and CE-3.

TABLE 1

Structural Characteristics of Examples 1-14 and Comparative Examples

| Example | Thickness (mm) | Density (g/cm$^3$) | Compression at 1 MPa (%) | Compression at 16 MPa (%) | % Reinforcement Region vs Total Thickness |
|---|---|---|---|---|---|
| 1 | 1.400 | 0.68 | 37 | N/A | 3% |
| 2 | 0.455 | 0.63 | 18 | 46 | 12% |
| 3 | 0.310 | 0.62 | 28 | 48 | 17% |
| 4 | 0.717 | 0.30 | 48 | N/A | 9% |
| 5 | 1.420 | 0.44 | 44 | N/A | 3% |
| 6 | 0.295 | 0.55 | 29 | 51 | 4% |
| 7 | 1.850 | 0.62 | 42 | 71 | 5% |
| 8 | 0.246 | 0.66 | 21 | 44 | 5% |
| 9 | 0.446 | 0.66 | 16 | 47 | 27% |
| 10 | 0.350 | 0.35 | 37 | 55 | 35% |
| 11 | 0.395 | 0.38 | 48 | 71 | 2% |
| 12 | 1.089 | 0.54 | 29 | N/A | 5% |
| 13 | 0.335 | 0.65 | 18 | 31 | 24% |
| 14 | 0.310 | 0.62 | 28 | 48 | 17% |
| CE-1 | 0.134 | 0.88 | 5 | 8 | N/A |
| CE-2 | 1.090 | 1.02 | 4 | N/A | N/A |
| CE-3 | 0.555 | 0.60 | 5 | 51 | N/A |

As shown in Table 1, the example supported elastomeric foams varied in thickness from about 246 μm up to about 1.85 mm, and tolerated compression strains from about 16 to 48% (at 1 MPa), or from about 31 to 71% (at 16 MPa), indicating a very high degree of compressibility of the example foams and the ability to adjust compressibility with material composition. According to embodiments, supported elastomeric foams can compress from about 20% to 80% (at 16 MPa). In Table 1, "N/A" denotes a sample which began to plastically deform or exhibit signs of damage at 16 MPa. Comparative sealant layers formed of alternative materials (i.e., liquid sealants, an ePTFE layer) were prepared within the same approximate range of thicknesses, but notably, these comparative sealants did not exhibit comparable compression strains at compression values in the 1 MPa range. The fluorosilicone comparative example, CE-1, which is a fully dense elastomer sheet, only compresses~4% under load, therefore it cannot have a good working range. The polysulfide comparative example CE-2, similarly, compressed only~8% at 16 MPa, so it also has a low working range. The ePTFE comparative example CE-3 compresses much more than the fluorosilicone or polysulfide comparative examples at 51% at 16 Mpa. However, the ePTFE comparative example takes a 48% compression set (see Table 2,) which indicates poor recovery after compression.

Table 2 refers to hysteresis values for strain recovery for select samples, including percent strain energy maintained and percent compression set after compression at between 25% and 30% strain. The % strain energy retained is a measure of how much return force the composite imparts while recovering compared to the amount used to initially deform the composite, and is calculated based on the area under a stress-strain curve obtained while unloading the sample, compared to the area under a stress-strain curve obtained while loading the sample. Specifically, the % strain energy retained can be defined as the strain energy measured while unloading the sample (after deformation), divided by the strain energy measured while initially loading the sample. Compression set is a measure of the permanent deformation of a sample after an applied strain, and is measured by measuring the final strain after fully unloading the sample, and dividing this value by the original deflection or peak strain.

TABLE 2

Hysteresis Values for Select Examples

| Example # | Hysteresis Curve: % Strain Energy Maintained | Hysteresis Curve: % Compression Set (% permanent deformation) |
|---|---|---|
| 1 | 68% | 21% |
| 3 | 61% | 23% |
| 5 | 68% | 24% |
| 6 | 59% | 21% |
| 7 | 70% | 11% |
| 11 | 53% | 17% |
| 13 | 78% | 44% |
| CE-1 | 63%* | 29%* |
| CE-2 | 92%* | 14%* |
| CE-3 | 92%* | 48%* |

As shown in Table 2, most of the tested supported elastomer foams achieved nearly full recovery after compression, with compression sets on the order of 11-24% (based on the % of strain applied) for most examples, and at 44% for example 13. Example 13 has a higher reinforcement region thickness than the other samples listed in Table 2, and differs from the other examples in having partially imbibed reinforcing regions (approximately 20-60% filled) rather than fully imbibed reinforcing regions. Here, '*' denotes applied strain greater than or equal to 30%. The comparative examples demonstrated compression sets from 14% (Fluorosilicone) to 48% (ePTFE layer). In particular, CE-1 CE-2 are rubber sealants which should have good compression set properties. The values for the rubber comparative examples demonstrated compression sets from 14% (Fluorosilicone) to 29% (Polysulfide), indicating that the supported elastomer foams performed at least comparably to or better than the comparative example rubber sealants in terms of compression set. The ePTFE comparative example, CE-3 exhibits less satisfactory compression set properties than the comparative example rubber sealants, demonstrated as 48%, but compresses significantly more than CE-1 and CE-2 demonstrated as 51% compression at 16 MPa (see Table 1). The supported elastomeric foams combine the desirable properties of rubber sealants and ePTFE sealants, demonstrating both good compression set properties and the ability to compress to high strains. Thus, the example elastomeric foams exhibit good compression set behavior while exhibiting excellent compressive range. The high strain energy retained, as shown by the examples, suggest that they would make good dynamic seals because they recover well (as indicated by the low compression set), while also maintaining good return force (necessary for sealing) during that recovery. Thus, these values for strain energy retained suggest that the example elastomeric foams would maintain good seal integrity over time.

Table 3 refers to the percent stress retained in select samples after a relaxation period of five minutes during a constant strain. The strain held on the samples was between 18% and 25% strain, except for select examples denoted by '*', to which lower strains were applied (e.g., less than 16% strain). This value was obtained by measuring the modulus of each sample both immediately upon application of peak strain, and at a time period after, and dividing the modulus at 5 minutes past the peak strain by the modulus at the time of peak strain.

TABLE 3

Stress Relaxation

| Example # | % Stress Retained |
|---|---|
| 1 | 62% |
| 2 | 83% |
| 3 | 83% |
| 4 | 58% |
| 5 | 68% |
| 6 | 82% |
| 7 | 54% |
| 8 | 95%* |
| 9 | 94%* |
| 10 | 71% |
| 11 | 45% |
| 12 | 79% |
| 13 | 82%* |

Note that * denotes sample strain of less than or equal to 16%. As shown in Table 3, the example supported elastomeric foams typically retained a high percentage of return force during constant compression, as indicated by stress retention ratios on the order of 45 to 95%. This retention of return force is very important for fastened assemblies and, for example, could relate to higher retained torque on bolts and higher retained compression pressure on rivets over time.

Table 4 refers to the compressed sealing capability and weight pickup of select supported elastomeric foams against jet fuel ingress into a cell protected by the supported elastomeric foams, for select examples. The example supported elastomeric foams were loaded into a cell including a transparent top portion, and compressed to a nominal pressure to achieve strain of less than 15%. The samples were then introduced to a dyed solution of JP8 fuel, and assessed visually for jet fuel penetration into the loaded foam, and then sampled for weight pickup (of jet fuel).

TABLE 4

Weight Pickup and Jet Fuel Ingress

| Example # | % Weight Pickup Jet Fuel in Compressed Immersion | Applied Strain that Prevents Jet Fuel Ingress | Estimated Stress at Ingress Seal (MPa) |
| --- | --- | --- | --- |
| 2 | 0.6% | 10.0% | 0.59 |
| 9 | 0.6% | 11.5% | 0.88 |
| 14 | −1.6% | 13.7% | 0.11 |

Jet fuel was used as a practical working liquid to demonstrate the effectiveness of the above-described embodiments of supported elastomeric foams at sealing an interface from an aggressive challenge fluid. As shown in Table 4, representative supportive elastomeric foams were effective at preventing liquid intrusion with minimal absorption of the jet fuel at relatively low applied strain. In some cases, the testing apparatus was reset at one or two sequentially descending applied strains, beginning at about 15% strain, and tested until visible ingress of jet fuel was observed. A "pass" was noted when minimal (i.e. <1%) visible ingress of JP8 was observed after 20 hours submerged in dyed JP8, indicating that the selected sample created an ingress seal at the selected % compressive strain. The stresses on each sample, at the minimum strain of the series of tested strains that achieved an ingress seal, are listed with reference to the applied strain at ingress seal. However, each example may also seal at strains below the minimum tested stress/strain that achieved a "pass." Testing assemblies including supported elastomeric foams according to Examples 2 and 9 absorbed only a small amount of jet fuel, resulting in absorption of about 0.6% the weight of each supported elastomeric foam. The testing assembly using the supportive elastomeric foam of Example 14 actually lost a small amount of mass, likely due to one or more adhesive dots coming into contact with the jet fuel at the periphery of the testing assembly and losing mass through degradation of the adhesive. Thus, the supported elastomeric foam of Example 2 created an ingress seal to JP8 jet fuel at or below 10% compressive strain and 0.59 MPa compressive stress; the foam of Example 9 created an ingress seal at or below 11.5% compressive strain and at 0.88 MPa compressive stress; and the foam of Example 14 created an ingress seal at or below 13.7% compressive strain and at 0.11 MPa compressive stress.

Depending on the specific supported elastomeric foam and other structural factors, e.g., roughness of interface surfaces, etc., supported elastomeric foams may prevent ingress at strains of as low as or lower than 10%. In some embodiments, elastomeric foams can deform by an amount greater than or equal to 50%, 60%, or 70%, depending on the applied pressure; and the elastomeric foams will prevent liquid ingress at any suitable level of applied pressure. Thus, supported elastomeric foams are operable to seal an interface across a very broad working range, i.e., at strains varying from as low as or lower than 10% to more than 70%.

Adhesive Examples

To demonstrate the benefits of discontinuous adhesive coating for sealants, some examples of sealants (including supported elastomeric foams) were created and tested.

Example 15 is a sealant formed of an ePTFE film supported elastomeric foam. The supported elastomeric foam includes of two reinforcement regions, one on each face, and a dot patterned pressure sensitive adhesive on one of those faces. Each of the two reinforcement regions utilizes an embedded porous ePTFE layer having an initial thickness of about 16 μm and an initial density of about 0.28 g/cm$^3$ made by W. L. Gore and Associates. A perfluoropolyether elastomer, SIFEL 2661 from Shin-Etsu (Shin-Etsu Chemical Co., Ltd., Tokyo, JP) was selected as the elastomer and mixed with EXPANCEL 920 DU 20 expanding polymer spheres (Expancel, Sundsvall, Sweden) as the foaming agent, in a 6.7:01 mixing ratio by mass. The mixture was imbibed into both of the ePTFE porous layers and drawn down with a tool gap of 0.076 mm before being heat treated at 150° C. for 10 minutes to activate the foaming agent and begin the elastomer cure. The composite was then heat treated at 100° C. for 60 minutes to complete the cure. A pattern of the two-part pressure sensitive adhesive PSA-16 (Silicone Solutions, Ltd., Cuyahoga Falls, Ohio, USA) was applied using a form made of a sheet of stainless steel about 0.025 mm thick with a hole pattern. The PSA-16 pressure sensitive adhesive was prepared by mixing Part A and Part B in a 16:01 ratio by mass. The mixed PSA-16 adhesive was applied on top of the steel and the supported elastomer foam composite underneath the steel was selectively coated with the liquid adhesive. The adhesive-coated composite was then heat treated at 125° C. for 75 mins to cure the adhesive. This example sealant is shown in both FIGS. 8 and 9; where FIG. 8 shows a top surface image taken at a magnification of 10×, and FIG. 9 shows a cross-section image taken at a magnification of 57×. For the cross-section, the sample was cut with a liquid nitrogen dipped steel razor blade in an effort to preserve the cross-sectioned surface. The adhesive pattern employs adhesive "dots" having diameters of about 0.97 mm, edge to edge spacing of each dot to the next closest dot of about 2.19 mm, and each adhesive dot having a thickness of about 0.031 mm.

Example 16 is a sealant formed of a similar supported elastomeric foam as Example 15, i.e., SIFEL 2661-based supported elastomeric foam, but with a 07:01 mixing ratio by mass of SIFEL to the EXPANCEL foaming agent, with the same adhesive geometry, but utilizing a different adhesive. Unlike Example 15, which required heat treatment to set the adhesive, Example 16 uses the UV-set, pressure sensitive acrylic adhesive SP-7555 (3M Inc., St. Paul, Minn., USA). The UV-set pressure sensitive acrylic adhesive of Example 16 was cured using a Dymax Bluewave 75 high intensity UV light source (Dymax, Inc., Torrington, Conn., USA) at a distance of 0.5-3 inches from the face of the composite for at least 30 seconds.

Example 17 is a sealant formed using a similar supported elastomeric foam and pressure sensitive adhesive as Example 15, i.e., SIFEL 2661-based supported elastomeric foam, with a differing adhesive geometry. In Example 17, the PSA-16 pressure sensitive adhesive is applied in the form of loosely spaced, discontinuous squares, spaced about 4.24 mm apart and having dimensions of about 1 mm.

According to some embodiments, discontinuous adhesives may be applied to compressible sealant layers other than supported elastomeric foams. Accordingly, Example 18 is a sealant formed from the commercially available Buna-N foam (acrylonitrile butadiene), available from McMaster-Carr as part no. 1887T32 (McMaster-Carr, Santa Fe Springs, Calif., USA). In Example 18, a 1/16" foam (1.5875 mm) is used with the same adhesive and adhesive geometry as described above with respect to Example 15, i.e., an adhesive pattern employing adhesive "dots" of PSA-16 pressure sensitive adhesive having diameters of about 0.97 mm, edge to edge spacing of each dot to the next closest dot of about 2.19 mm, and each adhesive dot having a thickness of about 0.031 mm.

The performance of example sealants Example 15 and 18 (which employ discontinuous adhesive regions) was measured with comparison to the performance of comparative example sealants with continuous adhesive coatings.

Comparative Examples CE-4 and CE-5 show the baseline performance for the two seal types used in the tested samples, a film supported Sifel 2661 foam (CE-4) and a Buna-N foam (CE-5) without adhesive coatings. The best result with the method described above is to have a slightly positive % mass change after immersion, which would indicate that none of the composite material was dissolved in the challenge fluid and very little penetrated in to the seal. CE-4 shows a value of 0.3%, which meets this description. CE-5 shows a higher value of 16.4%, which means that a small amount of the challenge fluid was able to penetrate in to the seal, but that the material did not dissolve.

CE-6 and CE-7 employ similar constructions to CE-4 and CE-5, respectively, with the addition of a continuous adhesive coating. These examples can be used to evaluate how adding a continuous adhesive layer will affect the ability of the seal to limit ingress and characterize the amount of adhesive degradation. Comparative Example CE-6 is a sealant formed of a similar supported elastomeric foam as Examples 15-17 and CE-4, i.e., SIFEL 2661-based supported elastomeric foam, with a differing adhesive geometry. In Example CE-6, the PSA-16 adhesive is applied in the form of a continuous coating having a thickness of about 0.025 mm.

Comparative Example CE-7 is a sealant formed of a similar Buna-N foam as Example 18 and CE-5, with a different adhesive geometry. In Example CE-7, the PSA-16 adhesive is applied in the form of a continuous coating having a thickness of about 0.025 mm.

Comparative Examples CE-6 and CE-7 include a continuous adhesive coating and show the difference between continuous and discontinuous adhesive coating seal performance and chemical compatibility. Notably, both CE-6 and CE-7 undergo a significant negative mass change after compressed immersion in JP-8, indicative of chemical attack on the continuous adhesive. All of the examples using Film Supported Sifel 2661 Foam use a similar foam as described in Example 15. All of the examples using Buna-N foam use the 1/16" thick Buna-N foam sheet part number 1887T32 from McMaster-Carr. All of the examples using the PSA-16 Silicone PSA use a similar application and curing step as described in Example 15. All of the examples using 3M SP-7555 UV-set acrylic, pressure sensitive adhesive use a similar application step as described in Example 15, but were cured using a Dymax Bluewave 75 high intensity UV light source at a distance of 0.5-3 inches from the surface for at least 30 seconds.

Table 5 refers to the compressed weight pickup of select adhesive coated supported elastomeric foams and Buna-N foams against jet fuel ingress into a cell protected by the foams, for select examples. The example adhesive coated foams were loaded into a cell including a transparent top portion, and compressed to a nominal pressure to achieve a compressive strain of between 10 and 25%. The samples were then introduced to a dyed solution of JP8 fuel, and sampled for weight pickup (of JP8 jet fuel).

TABLE 5

Adhesive Examples: Weight Pickup and Jet Fuel Ingress

| Example # | Sealant Description | Adhesive Description | % Weight Pickup Jet Fuel in Compressed Immersion |
|---|---|---|---|
| 15 | Supported Elastomeric Foam | PSA-16 Tight Circular Dot Pattern | −0.6% |
| 16 | Supported Elastomeric Foam | 3M SP-7555 Acrylic PSA Tight Circular Pattern | Not Tested |
| 17 | Supported Elastomeric Foam | PSA-16 Loosely Spaced Square Pattern | Not Tested |
| 18 | Buna-N Foam | PSA-16 Tight Circular Dot Pattern | 14.0% |
| CE-4 | Supported Elastomeric Foam | No Adhesive Coating | 0.3% |
| CE-5 | Buna-N Foam | No Adhesive Coating | 16.4% |
| CE-6 | Supported Elastomeric Foam | PSA-16 Continuous Coating | −13.6% |
| CE-7 | Buna-N Foam | PSA-16 Continuous Coating | −4.6% |

Jet fuel was used as a practical working liquid to demonstrate the effectiveness of the above-described embodiments of discontinuous patterned adhesive regions at resisting degradation from an aggressive challenge fluid. Each of the two seal types used, i.e. the supported elastomeric foam and Buna-N foam, is stable in JP8 jet fuel. The PSA-16 pressure sensitive adhesive used is not stable in JP8 jet fuel. As described above, in the case of a continuous coating, the cut edge of the adhesive is in contact with the fuel and can allow for the fuel to ingress in to the interface and degrade the adhesive. In the case of a discontinuous pattern of adhesive, the compressible body of the seal can compress around each adhesive region and protect it from chemical attack. As shown in Table 5, for the supported elastomeric foam, Example 15 with the discontinuous adhesive pattern shows minimal evidence of adhesive degradation with a −0.6% weight pick up. However, a similar seal with a continuous adhesive coating, Example CE-6, has −13.6% weight pick up, suggesting significantly more degradation and ingress. Similarly for the Buna-N foam samples, the continuous adhesive coating example, CE-7 showed a significantly more negative weight pick up than Example 18 with a discontinuous adhesive pattern with −4.6% compared to 14.0%. A control test for each compressible substrate was conducted, i.e. for the Buna-N foam as well as the supported elastomeric foam, in which a weight pickup and jet fuel ingress test was conducted using just each respective sealant without adhesive. The control test of the elastomeric foam had a weight pick up of 0.3%. The control test of the Buna-N foam had a weight pick up of 16.4%. Table 6 shows the same compressed immersion test results represented as data normalized to the control samples, Examples CE-4 and CE-5. With both sealant types, when adding a tight dot pattern of adhesive, the % weight pick up value decreases slightly, by 0.9% and 2.4% for the supported elastomeric foam and Buna-N, respectively, showing slight degradation of dots near a cut edge. Again with both sealant types, when adding a continuous coating of adhesive, the % weight pick up value decreases dramatically, by 13.9% and 21.0% for the supported elastomeric foam and Buna-N, respectively, showing that significantly more degradation of a continuous adhesive occurs than of a dot patterned, discontinuous adhesive.

In the case of both seal types (i.e., supported elastomeric foam and Buna-N foam), when applying a continuous layer of adhesive which is not chemically stable in jet fuel, the % mass change is a significantly negative value due to adhesive dissolving upon contact with the jet fuel. When applying the same adhesive in a discontinuous adhesive coating, the magnitude of the % mass change decreases by a significant extent since most of the adhesive regions are sealed from contact with the fuel by the conformable seal material which is stable in jet fuel. Normalized compression data is provided below in Table 6, which illustrates the difference in mass change between comparable materials with discontinuous and with continuous adhesives.

TABLE 6

Normalized Compressed Immersion Data

| Example # | Sealant Description | Adhesive Description | Difference in % Mass Change from Example without Adhesive |
|---|---|---|---|
| CE-4 | Supported Elastomeric Foam | PSA-16 No Adhesive Coating | 0 |
| 15 | Supported Elastomeric Foam | PSA-16 Tight Circular Dot Pattern | −0.9% |
| CE-6 | Supported Elastomeric Foam | PSA-16 Continuous Coating | −13.9% |
| CE-5 | Buna-N Foam | PSA-16 No Adhesive Coating | 0 |
| 18 | Buna-N Foam | PSA-16 Tight Circular Dot Pattern | −2.4% |
| CE-7 | Buna-N Foam | PSA-16 Continuous Coating | −21.0% |

Thermal and Chemical Stability Testing

Additional embodiments of supported elastomeric foams and components of the composite foams were produced and tested for temperature stability and various mechanical performance characteristics.

Example 19—for Temperature and Chemical Stability, and Helium Leak Testing

According to a nineteenth example, a supported elastomeric foam having a thickness of about 300 μm was formed using two similar porous support layers made of 0.28 g/cc ePTFE having thicknesses of approximately 16 μm, sandwiching a foamed region. The foamed region was formed of an elastomer/foaming reagent mixture containing SIFEL 2661 (Shin-Etsu Chemical Co., Ltd., Tokyo, JP) as the elastomer and EXPANCEL 920 DU 20 expanding polymer spheres (Expancel, Sundsvall, Sweden) as the foaming agent, in a 7:1 mixing ratio by mass.

Example 20—for Temperature Stability

According to a twentieth example, a supported elastomer was formed using one porous support layer made of 0.27 g/cc ePTFE having thicknesses of approximately 34 μm fully filled with SIFEL 2661 elastomer (Shin-Etsu Chemical Co., Ltd., Tokyo, JP). The high temperature stability of the entire supported elastomer foam composite will be a function of the supported elastomer temperature stability or the foaming agent temperature stability, whichever is lower.

Temperature Stability Data (High and Low)

Low temperature stability testing measurements were conducted using a sample prepared according to Example 19 while performing tests on a Dynamic Mechanical Analyzer (DMA). The glass transition temperature of the supported elastomeric foam can be calculated using a shift in complex modulus (DMA). High temperature stability testing measurements were conducted using a sample prepared according to Example 20 while performing tests on a Thermogravimetric Analyzer (TGA). The high use temperature can be calculated by observing mass loss during a temperature sweep (TGA).

Comparative temperature stability measurements were conducted using a sample prepared according to Example 19 while performing a temperature sweep from very low to high temperatures and measuring the effects of temperature on the sample by Dynamic Mechanical Analysis (DMA) and Thermogravimetric Analysis (TGA). Comparative examples were prepared and tested according to the same test protocols, including a sample of Polysulfide (PR-1782 B2) low density sealant (PRC-DeSoto International, Inc., Sylmar, Calif., USA); a sample of SIFEL 2661 elastomer (Shin-Etsu) tested alone, a sample of KALREZ Spectrum K #5021 rubber sealant (DuPont, Inc., DE, USA). Polysulfide was chosen due to its common use as a liquid sealant in the aircraft industry, and KALREZ was chosen as a commonly known chemically resistant rubber.

The glass transition temperature was calculated by the change in complex modulus as the sample was subjected to repeated tensile strain by a RSA3 Dynamic Mechanical Analyzer (TA Instruments, New Castle, Del., USA) in tensile mode at a frequency of 1 Hz. The pure SIFEL 2661 and Polysulfide comparative samples each had an approximate glass transition temperature (TG) of about −45° C. while the supported elastomeric foam of Example 19 had a slightly lower TG at −50° C. The KALREZ rubber comparative sample had a significantly higher TG of about −8° C. This shows that although KALREZ may have the appropriate level of chemical resistance, it does not have satisfactory low temperature performance for most aerospace applications. The supported elastomer foam of example 19, however, provides both properties.

The sample of SIFEL 2661 as described above was tested under TGA using a Q5000IR Thermogravimetric Analyzer (TA Instruments, New Castle, Del., USA) and subjected to an increasing temperature ramp starting from ambient temperature. The sample exhibited a 1% mass loss at 266° C., indicative of satisfactory temperature resistance up to at least this temperature. When combined with the ePTFE porous layers, the assembly (i.e., the composite of Example 20) exhibited less than 1% mass loss through over 200° C., indicating satisfactory temperature resistance for the composite as well. As discussed above, the temperature stability of the supported elastomer foam composite will be a function of the foaming agent chosen, i.e., the lower of the stable temperatures of the elastomer, reinforcing ePTFE porous layers, and foaming agent.

Aircraft Fluid Stability

Liquid compatibility was measured for a sample of elastomeric foam according to Example 19, as well as two comparative liquid polysulfide samples: B2 grade polysulfide sealant PR-1782-B-2, and C2 grade polysulfide sealant PR-1782 C-2 (PPG Industries, Inc., Pittsburgh, Pa., USA). The samples were subjected to a different liquid intrusion/ weight pick up test than that described above. Each sample was cut to a circular shape using a punch, and then weighed to obtain an initial mass. For each material, respective 3-replicate stack-ups were assembled using cut stainless steel brackets having a through-hole approximately sized to match the samples, to allow for both face surfaces of each sample to be exposed to fluid while exerting compression on the sample perimeter. The sample perimeter was lightly compressed between two cut pieces of stainless steel shim stock. The stackup was then immersed in the fluid of interest in a beaker for 20 hours. After disassembly, the samples were gently wiped dry and weighed to obtain a final mass.

Immersion test results were obtained in the form of weight change of the sample due to immersion in each of water, JP8 fuel, and SKYDROL LD4 aircraft hydraulic fluid (Eastman Chemical Company, Inc., Kingsport Tenn., USA). The elastomeric foam according to Example 19 exhibited minimal weight change, i.e. less than 2% in each challenge fluid, and was chemically stable, i.e., no loss of mass. The B2 grade polysulfide sealant exhibited about 20% mass absorption of the hydraulic fluid and slight degradation (mass loss) in the JP8 jet fuel. The C2 grade polysulfide sealant, while stable in JP8 fuel, exhibited significant liquid absorption in water (>10% mass) and in hydraulic fluid (about 55% mass). The results indicate excellent stability of the elastomeric foam against these common types of challenge fluids encountered in aerospace applications.

Helium (He) Leak Testing

A sample of the elastomeric foam composite according to Example 19 was tested for seal efficacy against gas using helium in a gas leak testing protocol similar to European standard test EN13555. The sample was cut in to a ring having an inner diameter of 49 mm and an outer diameter of 92 mm and placed in a gasket position between a raised plate DN40 and blind flange PN40, both steel and having standard surface roughness of approximately Ra 3.2-6.3 µm. The sample assembly was subjected to load in an AMTEC Multipurpose TEMES fl.ai1 sealant test rig (AMTEC Advanced Measurement GmbH, Germany) while being subjected to helium flow at a constant differential pressure of 1.5 bar (0.15 MPa). The sample was subjected to an initial compressive stress of 1 MPa, then ramped down to 0.3 MPa to characterize recovery, then sequentially ramped up in compressive stress to 200 MPa, and then ramped back down to 0.3 MPa, with the aim to detect limitations on the ability of the sample to maintain a gas seal after recovery from increasingly severe compressive strains, i.e. strains simulating clamping pressure or fastening pressure of an installed component. Helium leak rate is a common criteria for measuring the sealing power of a gasket. Common efficacy criteria for a gas seal is generally at least as low as a $10^{-2}$ mg/m/sec He leak rate, and for liquid seals at least as low as a $10^{-1}$ mg/m/sec He leak rate. Although some elastomers (e.g. silicone) can achieve seals with very low gas leak rates (i.e., $<10^{-1}$ mg/m/sec He), such materials tend to "crush" at compressive stresses in excess of 30 MPa, after which they no longer provide an effective seal when compressive stress is reduced. Such materials may also mechanically fail upon such compressive stress leading to the creation of leak paths.

It was found that the gasket formed by the elastomeric foam composite formed a gas tight seal at very low clamping pressures and under repeated, severe mechanical stress. Under the above experimental conditions, an initial He leak rate lower than $10^{-6}$ mg/m/sec was observed at the initial gasket stress (i.e., clamping pressure) of 1 MPa, indicating that a gas tight seal is formed by the gasket at clamping pressures less than or equal to 1 MPa. The He leak rate remained below $10^{-6}$ upon initial recovery to 0.3 MPa compressive stress, and remained below $10^{-6}$ throughout compressive stress cycling to 200 MPa and back to 0.3 MPa, further indicating that a gas tight seal is also formed and retained at clamping pressures at or below 0.3 MPa. Finally, upon visual inspection of the sample after stress cycling, no permanent crushing or damage was observed. In summary, the elastomeric foam composite of Example 19 exhibits a He leak rate of less than $10^{-6}$ mg/m/sec at a He differential pressure of 0.15 MPa across a range of compressive stresses from 0.3 MPa to 200 MPa, and maintains a He leak rate of less than $10^{-6}$ upon recovery after compressive stress up to at least 200 MPa.

The invention has now been described in detail for the purposes of clarity and understanding. However, those skilled in the art will appreciate that certain changes and modifications may be practiced within the scope of the appended claims.

In the preceding description, for the purposes of explanation, numerous details have been set forth in order to provide an understanding of various embodiments of the present disclosure. It will be apparent to one skilled in the art, however, that certain embodiments may be practiced without some of these details, or with additional details. Further, specific materials and material properties as described with reference to one embodiment (e.g., material densities, porosities, thicknesses, alternative materials, etc.) may be combined or used in place of materials described in other embodiments except where explicitly contraindicated.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present disclosure. Accordingly, the above description should not be taken as limiting the scope of the present disclosure or claims.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the present disclosure, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

In the following, further examples are described to facilitate understanding of the disclosure:

E1. A supported elastomeric foam includes an elastomeric matrix including a foamed region and a reinforcement region. The foamed region includes the elastomer and a plurality of gas filled cells defined by the elastomer, and the reinforcement region includes a porous layer having an interconnected network of pores at least partially imbibed with the elastomer.

E2. The foam of any of the preceding examples, wherein the porous layer is fully imbibed with the elastomer.

E3. The foam of any of the preceding examples, wherein the reinforcement region is a first reinforcement region, and further including a second reinforcement region including a second porous layer having a second interconnected network of pores at least partially imbibed with the elastomer, wherein the first reinforcement region is positioned at a first side of the foamed region, and the second reinforcement region is positioned at a second side of the foamed region opposite the first side.

E4. The foam of any of the preceding examples, wherein the reinforcement region is substantially free of gas filled cells.

E5. The foam of any of the preceding examples, wherein the elastomer is a first elastomer and the elastomeric matrix further includes a second elastomer, wherein the first and second elastomers are mixed to form the elastomeric matrix.

E6. The foam of any of examples 1-5, wherein the porous layer includes a woven material.

E7. The foam of any of the preceding examples, wherein the porous layer includes an expanded fluoropolymer film.

E8. The foam of any of the preceding examples, wherein the porous layer includes an expanded polytetrafluoroethylene (ePTFE) film.

E9. The foam of any of examples 1-5, wherein the porous layer includes a polyether ether ketone (PEEK) woven.

E10. The foam of any of examples 1-5, wherein the porous layer includes a fiberglass material.

E11. The foam of any of the preceding examples, in the form of a sheet having a thickness from 85 to 2000 μm.

E12. The foam of any of examples 1-10, in the form of a roll.

E13. The foam of any of examples 1-5, wherein the porous layer includes an ePTFE film having a thickness from 8 to 35 μm.

E14. The foam of any of examples 1-5, wherein the porous layer includes an ePTFE film having a thickness from 1 to 100 μm.

E15. The foam of any of the preceding examples, wherein the gas-filled cells have an average cell size, by diameter, from about 5 μm to about 700 μm.

E16. The foam of any of the preceding examples, wherein the elastomer includes silicone, fluorosilicone, or a perfluoropolyether.

E17. The foam of any of examples 1-15, wherein the elastomer includes a fluoroelastomer.

E18. The foam of any of the preceding examples, wherein the foamed region is formed from a foamed mixture including the elastomer and a foaming agent.

E19. The foam of any of the preceding examples, wherein the foamed region is formed via a chemical foaming agent added to the elastomer.

E20. The foam of any of examples 1-18, wherein the foamed region is formed from a foamed mixture including the elastomer and a heat activated dry foaming agent.

E21. The foam of example 20, wherein the foaming agent includes heat activated expanding polymer spheres.

E22. The foam of any of the preceding examples, wherein the foamed region has a thickness from 90 μm to 1850 μm.

E23. The foam of any of the preceding examples, wherein the foam compresses to a strain of up to 85% under stress of 16 MPa.

E24. The foam of any of the preceding examples, wherein the foam exhibits a compression set as low as or lower than 11% when subjected to an initial strain of 25%.

E25. The foam of any of the preceding examples, wherein the foam absorbs less than 2.0% JP-8 fuel by weight when immersed over 20 hours with compression.

E26. The foam of any of the preceding examples, wherein the foam is operable to prevent liquid intrusion when the foam is inserted into an interface according to a liquid intrusion test when the foam is subjected to compressive strain of 15% or less.

E27. The foam of any of the preceding examples, wherein the foam is operable to seal an interface against liquid intrusion at a range of temperatures from −50° C. to at least 100° C.

E28. The foam of any of the preceding examples, further including a first release liner removably connected with one of the reinforcement and foamed regions.

E29. The foam of example 28, further including a second release liner removably connected with the other of the reinforcement and foamed regions.

E30. The foam of any of the preceding examples, further including a pattern of discontinuous adhesive regions connected with at least one of a first surface or a second surface of the elastomeric matrix, wherein the elastomeric matrix is operable to conform around the adhesive regions to prevent fluid ingress via the adhesive regions when the elastomeric foam is compressed in a direction perpendicular to the first or second surface.

E31. A dry sealing gasket including the foam of any of the preceding examples.

E32. A dry sealing washer including the foam of any of the preceding examples.

E33. A method of forming a dry sealant foam, the method including:
providing a porous layer including an interconnected network of pores;
casting a liquid mixture of an elastomer and a foaming agent with the porous layer, positioning the porous layer at a first side of the liquid mixture, such that the liquid mixture wets the porous layer;
activating the foaming agent to create a plurality of closed gas-filled cells in the liquid mixture; and
curing the elastomer to form an elastomeric matrix containing a reinforcement region that includes the porous layer and a foamed region containing the plurality of gas-filled cells.

E34. The method of any of the preceding examples, wherein the porous layer is a first porous layer and the reinforcement region is a first reinforcement region, and further including:
providing a second porous layer including a second interconnected network of pores;
positioning the second porous layer at a second side of the liquid mixture opposite the first side, such that the liquid mixture wets the second porous layer; and
curing the elastomer to form the elastomeric matrix containing a second reinforcement region that includes the second porous layer.

E35. The method of any of the preceding examples, further including:
applying an adhesive to at least one of a first surface and second surface of the elastomeric matrix.

E36. The method of example 35, wherein applying the adhesive includes applying a pattern of discontinuous adhesive regions to the at least one of the first surface and second surface.

E37. The method of example 35, wherein applying the adhesive includes applying a full face adhesive to the at least one of the first surface and second surface.

E38. The method of any of the preceding examples, wherein the foaming agent includes a dry particulate foaming agent having a particle size larger than a pore size of the network of pores.

E39. The method of any of the preceding examples, wherein the porous layer includes a high strength ePTFE membrane having a thickness from 1 to 100 μm.

E40. The method of any of the preceding examples, wherein
the elastomer includes a thermoset fluoroelastomer and the foaming agent includes a heat activated foaming agent; and activating the foaming agent includes heating the liquid mixture to an activating temperature, such that the foaming agent forms the plurality of closed gas-filled cells.

E41. The method of any of the preceding examples, wherein the activating temperature is in a range of 100° C. to about 160° C.; and the activating step includes heating the liquid mixture to the activating temperature for 1 to 10 minutes.

E42. The method of any of the preceding examples, wherein the curing step includes heating the liquid mixture to a curing temperature of approximately 75° C. to 125° C. for 5 to 180 minutes.

E43. A compressible seal, including: a compressible body having a first surface and a second surface; and a pattern of discontinuous adhesive regions formed of an adhesive connected with at least one of the first surface or the second surface of the compressible body, wherein the compressible body is operable to conform around the pattern of adhesive regions to prevent fluid ingress, e.g. via the pattern, when the compressible body is compressed in a direction perpendicular to the first or second surface.

E44. The compressible seal of any of the preceding examples, wherein the pattern of discontinuous adhesive regions is connected with the first surface and the second surface of the compressible body.

E45. The compressible seal of any of the preceding examples, wherein the compressible body includes an elastomeric matrix including an elastomer.

E46. The compressible seal of any of the preceding examples, wherein the compressible body has a first thickness and is operable to compress by at least 15% of the first thickness under a compressive stress of 1 MPa, and wherein the pattern of adhesive regions has a thickness of less than 15% of the first thickness.

E47. The compressible seal of any of the preceding examples, wherein the pattern of discontinuous adhesive regions includes a plurality of circular adhesive dots.

E48. The compressible seal of any of the preceding examples, wherein the pattern of discontinuous adhesive regions includes a plurality of square adhesive regions.

E49. The compressible seal of any of the preceding examples, wherein the pattern of discontinuous adhesive regions includes circular dots having diameters from about 0.2 to 5 mm, edge to edge spacing of each dot to the next closest from about 0.5 to 25 mm, and thicknesses from about 10 μm to about 100 μm.

E50. The compressible seal of any of the preceding examples, wherein each adhesive region of the pattern of adhesive regions has a thickness of 10 to 50 μm.

E51. The compressible seal of any of the preceding examples, wherein each adhesive region has a thickness less than or equal to 100 μm, preferably less than or equal to 50 μm, or less than or equal to 25 μm, or less than or equal to 10 μm.

E52. The compressible seal of any of the preceding examples, wherein the adhesive includes a pressure sensitive adhesive (PSA) which is able to be deposited in a liquid or hot melt form, the adhesive including at least one of a silicone, acrylic, butyl rubber, ethylene-vinyl acetate, natural rubber, nitrile, styrene block copolymer, polyurethane, or mixture of any suitable combination thereof.

E53. The compressible seal of any of the preceding examples, wherein the adhesive includes a mixed two-part silicone pressure-sensitive adhesive.

E54. The compressible seal of any examples E43-E52, wherein the adhesive includes an acrylic adhesive.

E55. The compressible seal of any of the preceding examples, wherein the pattern of adhesive regions is formed of a UV-set contact adhesive.

E56. The compressible seal of any of the preceding examples, wherein the pattern of adhesive regions is formed by passing the adhesive through a form containing a pattern of holes onto the compressible body.

E57. The compressible seal of any of the preceding examples, wherein the pattern of adhesive regions is formed by printing the adhesive on the compressible body.

E58. The compressible seal of any of the preceding examples, wherein the compressible body includes an elastomeric matrix including:
a foamed region including a plurality of gas filled cells defined by the elastomer; and
a reinforcement region including a porous layer having an interconnected network of pores at least partially imbibed with the elastomer.

E59. The compressible seal of any of examples E43-E57, wherein the compressible body includes a foam rubber.

E60. The compressible seal of example E59, wherein the compressible body includes Buna-N foam.

E61. A method of forming a compressible seal, the method including: with a compressible body having a first surface; applying a pattern of discontinuous adhesive regions formed of an adhesive to the first surface of the compressible body to an adhesive thickness, the adhesive thickness being sufficiently thin compared to an uncompressed body thickness of the compressible body that the compressible body is operable to conform around the pattern of discontinuous adhesive regions when compressed.

E62. The method of any of the preceding examples, wherein the compressible body includes an elastomeric foam.

E63. The method of any of the preceding examples, wherein applying the pattern of discontinuous adhesive regions includes: removably applying a form having a hole pattern configured to match the pattern of discontinuous adhesive regions to the first surface; applying the adhesive to the form and to the first surface through the hole pattern of the form; and removing the form from the first surface.

E64. The method of any of the preceding examples, wherein applying the pattern of discontinuous adhesive regions includes printing the pattern of discontinuous adhesive regions on the first surface.

E65. The method of any of the preceding examples, further including curing the pattern of adhesive regions by applying a heat treatment to the adhesive.

E66. The method of any of the preceding examples, further including curing the pattern of adhesive regions by applying a UV light treatment to the adhesive.

E67. A supported elastomeric composite, including an elastomeric matrix including an elastomer, and including a foamed region including a plurality of gas filled cells defined by the elastomer; and a first reinforcement region including a porous layer having an interconnected network of pores at least partially imbibed with the elastomer and positioned at a first side of the foamed region, wherein the composite wherein the composite creates a gas tight seal when compressed between a pair of interface surfaces under a compressive stress of less than 1 MPa, preferably less than 0.3 MPa.

E68. The composite of example 67, wherein the composite creates the gas tight seal against the pair of interface surfaces with a He leak rate less than or equal to $10^{-2}$ mg/m/sec, preferably less than $10^{-4}$ mg/m/sec, preferably less than $10^{-6}$ mg/m/sec at a He differential pressure of 0.15 MPa.

E69. The composite of any of the preceding examples, wherein the composite creates the gas tight seal against the pair of interface surfaces with a He leak rate less than or equal to $10^{-2}$ mg/m/sec, preferably less than or equal to $10^{-6}$ mg/m/sec, at a He differential pressure of 0.15 MPa when the composite is subjected to repeated compressive stress cycling between 200 Mpa and 0.3 Mpa at a He differential pressure of 0.15 MPa.

E70. The composite of any of the preceding examples, wherein the composite withstands repeated compressive stress up to 200 MPa without damage to the composite, or wherein the composite reverts to an original shape without damage when subjected to repeated compressive stress at up to 200 MPa.

E71. The composite of any of the preceding examples, wherein the composite has a glass transition temperature of negative 45° C. or less, preferably negative 50° C. or less.

E72. The composite of any of the preceding examples, wherein the porous layer is fully imbibed with the elastomer.

E73. The composite of any of the preceding examples, wherein the reinforcement region is a first reinforcement region, and further including a second reinforcement region including a second porous layer having a second interconnected network of pores at least partially imbibed with the elastomer, wherein the first reinforcement region is positioned at a first side of the foamed region, and the second reinforcement region is positioned at a second side of the foamed region opposite the first side.

E74. The composite of example 73, wherein the first and second reinforcement regions include a 0.28 g/cc ePTFE porous layer, and wherein the foamed region includes a foamed mixture of perfluoropolyether elastomer and an expanded polymer sphere foaming agent in a 7:1 ratio by mass.

E75. The composite of any of the preceding examples, wherein the reinforcement region is substantially free of gas filled cells.

E76. The composite of any of the preceding examples, wherein the elastomer is a first elastomer and the elastomeric matrix further includes a second elastomer, wherein the first and second elastomers are mixed to form the elastomeric matrix.

E77. The composite of any of the preceding examples, wherein the porous layer includes one of a woven material, an expanded fluoropolymer film, an expanded polytetrafluoroethylene (ePTFE) film, a polyether ether ketone (PEEK) woven, or a fiberglass material.

E78. The composite of any of the preceding examples, wherein the porous layer includes an ePTFE film having a thickness from about 1 to 100 μm, preferably from 8 to 35 μm.

E79. The composite of any of the preceding examples, wherein the elastomer includes a silicone, fluorosilicone, perfluoropolyether, or other fluoroelastomer.

E80. The composite of any of the preceding examples, wherein the foamed region is formed from one or more of: a foamed mixture including the elastomer and a foaming agent, a chemical foaming agent added to the elastomer, or a foamed mixture including the elastomer and a heat activated dry foaming agent optionally including heat activated expanding polymer spheres.

E81. The composite of any of the preceding examples, wherein the foam compresses to a strain of up to 85% under stress of 16 MPa.

E82. The composite of any of the preceding examples, wherein the foam exhibits a compression set as low as or lower than 11% when subjected to an initial strain of 25%.

E83. The composite of any of the preceding examples, wherein the foam absorbs less than 2.0% JP-8 fuel by weight when immersed over 20 hours with compression as low as or lower than 10% strain.

E84. The composite of any of the preceding examples, further including a pattern of discontinuous adhesive regions connected with at least one of a first surface or a second surface of the elastomeric matrix, wherein the elastomeric matrix is operable to conform around the adhesive regions to prevent fluid ingress via the adhesive regions when the elastomeric foam is compressed in a direction perpendicular to the first or second surface.

E85. A dry sealing gasket or dry sealing washer including the composite of any of the preceding examples.

E86. A supported elastomeric composite, including: an elastomeric matrix including an elastomer, and including: a foamed region including a plurality of gas filled cells defined by the elastomer; and a first reinforcement region including a porous layer having an interconnected network of pores at least partially imbibed with the elastomer and positioned at a first side of the foamed region, wherein the composite has a glass transition temperature of negative 45° C. or less.

E87. The composite of example 86, wherein the composite has a glass transition temperature of negative 50° C. or less.

E88. The composite of any of the previous examples, wherein the composite creates a gas tight seal when compressed between a pair of interface surfaces under a compressive stress of less than 1 MPa, preferably less than 0.3 MPa E89. The composite of any of the preceding examples, wherein the composite creates the gas tight seal at a clamping pressure of 1.0 Mpa with a He leak rate less than or equal to $10^{-2}$ mg/m/sec, preferably less than or equal to $10^{-4}$ mg/m/sec, preferably less than $10^{-6}$ mg/m/sec, and more preferably less than or equal to $10^{-8}$ mg/m/sec at a He differential pressure of 0.15 MPa.

E90. The composite of any of the preceding examples, wherein the composite seals against the surface with a He leak rate less than or equal to $10^{-2}$ mg/m/sec, preferably less than $10^{-6}$ mg/m/sec, at a He differential pressure of 0.15 MPa when the composite is subjected to repeated compressive stress cycling between 1 MPa and 0.3 MPa, preferably between 200 MPa and 0.3 MPa.

E91. The composite of any of the preceding examples, wherein the composite withstands compressive stress of up to 200 MPa without damage, or wherein the composite reverts to an original shape without damage when subjected to repeated compressive stress at up to 200 MPa.

E92. The composite of any of the preceding examples, wherein the porous layer is fully imbibed with the elastomer.

E93. The composite of any of the preceding examples, wherein the reinforcement region is a first reinforcement region, and further including a second reinforcement region including a second porous layer having a second interconnected network of pores at least partially imbibed with the elastomer, wherein the first reinforcement region is positioned at a first side of the foamed region, and the second reinforcement region is positioned at a second side of the foamed region opposite the first side.

E94. The composite of example 93, wherein the first and second reinforcement regions include a 0.28 g/cc ePTFE porous layer, and wherein the foamed region includes a foamed mixture of perfluoropolyether elastomer and an expanded polymer sphere foaming agent in a 7:1 ratio by mass.

E95. The composite of any of the preceding examples, wherein the reinforcement region is substantially free of gas filled cells.

E96. The composite of any of the preceding examples, wherein the elastomer is a first elastomer and the elastomeric matrix further includes a second elastomer, wherein the first and second elastomers are mixed to form the elastomeric matrix.

E97. The composite of any of the preceding examples, wherein the porous layer includes one of a woven material, an expanded fluoropolymer film, an expanded polytetrafluoroethylene (ePTFE) film, a polyether ether ketone (PEEK) woven, or a fiberglass material.

E98. The composite of any of the preceding examples, wherein the porous layer includes an ePTFE film having a thickness from about 1 to 300 μm, preferably from about 1 to 100 μm, or preferably from 8 to 35 μm.

E99. The composite of any of the preceding examples, wherein the elastomer includes a silicone, fluorosilicone, perfluoropolyether, or other fluoroelastomer.

E100. The composite of any of the preceding examples, wherein the foamed region is formed from one of: a foamed mixture including the elastomer and a foaming agent, a chemical foaming agent added to the elastomer, or a foamed mixture including the elastomer and a heat activated dry foaming agent optionally including heat activated expanding polymer spheres.

E101. The composite of any of the preceding examples, wherein the foam compresses to a strain of up to 85% under stress of 16 MPa.

E102. The composite of any of the preceding examples, wherein the foam exhibits a compression set as low as or lower than 11% when subjected to an initial strain of 25%.

E103. The composite of any of the preceding examples, wherein the foam absorbs less than 2.0% JP-8 fuel by weight when immersed over 20 hours with compression as low as or lower than 10% strain.

E104. The composite of any of the preceding examples, further including a pattern of discontinuous adhesive regions connected with at least one of a first surface or a second surface of the elastomeric matrix, wherein the elastomeric matrix is operable to conform around the adhesive regions to prevent fluid ingress via the adhesive regions when the elastomeric foam is compressed in a direction perpendicular to the first or second surface.

E105. A dry sealing gasket or dry sealing washer including the composite of any of the preceding examples.

What is claimed is:

1. A supported elastomeric composite, comprising:
   an elastomeric matrix comprising:
      an elastomer;
      a foamed region;
      a first reinforcement region comprising a first porous layer having an interconnected network of pores fully imbibed with the elastomer and positioned at a first side of the foamed region; and
      a second reinforcement region comprising a second porous layer having a second interconnected network of pores fully imbibed with the elastomer, and positioned at a second side of the foamed region opposite the first side;
   wherein the first and second porous layers of the first and second reinforcement regions comprise one of a woven material, an expanded fluoropolymer film, an expanded polytetrafluoroethylene (ePTFE), a polyether ether ketone (PEEK) woven, or a fiberglass material;
   wherein the foamed region is between the first and second reinforcement regions, wherein the foamed regions comprises a plurality of gas filled cells defined by the elastomer; wherein the elastomer is continuous from the foamed region to the first and second reinforcement regions;
   wherein the first and second reinforcement regions are substantially free of gas filled cells such that the volume percentage of the voids formed in the reinforcement region are less than or equal to 10%, and
   wherein the composite is configured to create a gas tight seal when compressed between a pair of interface surfaces under a compressive stress of less than or equal to 1 MPa.

2. The composite of claim 1, wherein the composite is configured to create the gas tight seal against the pair of interface surfaces with a He leak rate less than or equal to 10-2 mg/m/sec at a He differential pressure of 0.15 MPa.

3. The composite of claim 1, wherein the composite is configured to create the gas tight seal against the pair of interface surfaces with a He leak rate less than or equal to 10-2 mg/m/sec, at a He differential pressure of 0.15 MPa when the composite is subjected to repeated compressive stress cycling between 200 MPa and 0.3 MPa at a He differential pressure of 0.15 MPa.

4. The composite of claim 1, wherein the composite withstands repeated compressive stress up to 200 MPa without damage to the composite.

5. The composite of claim 1, wherein the composite has a glass transition temperature of negative 45° C. or less.

6. The composite of claim 1, wherein the composite is configured to prevent fluid ingress while under less than or equal to 15% compressive strain.

7. The composite of claim 1, further comprising a pattern of discontinuous adhesive circular dots positioned along one or both of a first side and a second, opposite side of the composite.

8. The composite of claim 1, wherein the elastomer is a first elastomer and the elastomeric matrix further comprises a second elastomer, wherein the first and second elastomers are mixed to form the elastomeric matrix.

9. The composite of claim 1, wherein the porous layer comprises an ePTFE film having a thickness from 1 to 300 μm.

10. The composite of claim 1, wherein the elastomer comprises a silicone, a fluorosilicone, a perfluoropolyether, or a fluoroelastomer.

11. The composite of claim 1, wherein the foamed region comprises: a foamed mixture comprising the elastomer and a foaming agent, a chemical foaming agent added to the elastomer, or a foamed mixture comprising the elastomer and a heat activated dry foaming agent optionally comprising heat activated expanding polymer spheres.

12. The composite of claim 1, further comprising a pattern of discontinuous adhesive regions connected with at least one of a first surface or a second surface of the elastomeric matrix, wherein the elastomeric matrix is configured to conform around the adhesive regions to prevent fluid ingress via the adhesive regions when the elastomeric foam is compressed in a direction perpendicular to the first or second surface.

13. A dry sealing gasket or dry sealing washer comprising the composite of claim 1.

14. A supported elastomeric composite, comprising:
an elastomeric matrix comprising:
   an elastomer;
   a foamed region;
   a first reinforcement region comprising a first porous layer having an interconnected network of pores fully imbibed with the elastomer and positioned at a first side of the foamed region; and
   a second reinforcement region comprising a second porous layer having a second interconnected network of pores fully imbibed with the elastomer, and positioned at a second side of the foamed region opposite the first side;
wherein the first and second porous layers of the first and second reinforcement regions comprise one of a woven material, an expanded fluoropolymer film, an expanded polytetrafluoroethylene (ePTFE), a polyether ether ketone (PEEK) woven, or a fiberglass material;
wherein the foamed region is between the first and second reinforcement regions, wherein the foamed regions comprises a plurality of gas filled cells defined by the elastomer; wherein the elastomer is continuous from the foamed region to the first and second reinforcement regions;
wherein the first and second reinforcement regions are substantially free of gas filled cells such that the volume percentage of the voids formed in the reinforcement region are less than or equal to 10%,
wherein the composite has a glass transition temperature of negative 45° C. or less, and
wherein the composite is configured to create a gas tight seal when compressed between a pair of interface surfaces under a compressive stress of less than or equal to 1 MPa.

15. The composite of claim 14, wherein the composite has a glass transition temperature of negative 50° C. or less.

16. The composite of claim 15, wherein the composite is configured to create the gas tight seal against the pair of interface surfaces with a He leak rate less than or equal to 10-2 mg/m/sec at a He differential pressure of 0.15 MPa.

17. The composite of claim 16, wherein the composite is configured to create the gas tight seal against the pair of interface surfaces with a He leak rate less than or equal to 10-2 mg/m/sec when the composite is subjected to repeated compressive stress cycling between 200 MPa and 0.3 MPa at a He differential pressure of 0.15 MPa.

18. The composite of claim 14, wherein the composite is configured to prevent fluid ingress while under less than or equal to 15% compressive strain.

19. The composite of claim 14, further comprising a pattern of discontinuous adhesive circular dots positioned along one or both of a first side and a second, opposite side of the composite.

20. The composite of claim 14, wherein the elastomer is a first elastomer and the elastomeric matrix further comprises a second elastomer, wherein the first and second elastomers are mixed to form the elastomeric matrix.

21. The composite of claim 14, wherein the porous layer comprises an ePTFE film having a thickness from about from 1 to 300 μm.

22. The composite of claim 14, wherein the elastomer comprises a silicone, a fluorosilicone, a perfluoropolyether, or fluoroelastomer.

23. The composite of claim 14, wherein the foamed region comprises one of: a foamed mixture comprising the elastomer and a foaming agent, a chemical foaming agent added to the elastomer, or a foamed mixture comprising the elastomer and a heat activated dry foaming agent optionally comprising heat activated expanding polymer spheres.

24. The composite of claim 14, further comprising a pattern of discontinuous adhesive regions connected with at least one of a first surface or a second surface of the elastomeric matrix, wherein the elastomeric matrix is configured to conform around the adhesive regions to prevent fluid ingress via the adhesive regions when the elastomeric foam is compressed in a direction perpendicular to the first or second surface.

25. A dry sealing gasket or dry sealing washer comprising the composite of claim 14.

26. The composite of claim 1, wherein the volume percentage of the voids formed in the reinforcement region are less than or equal to 5%.

27. The composite of claim 14, wherein the volume percentage of the voids formed in the reinforcement region are less than or equal to 5%.

* * * * *